US009391665B2

(12) United States Patent
Niskanen et al.

(10) Patent No.: US 9,391,665 B2
(45) Date of Patent: Jul. 12, 2016

(54) METHOD AND APPARATUS FOR TIME DIVISION DUPLEX COMMUNICATION

(71) Applicant: BROADCOM CORPORATION, Irvine, CA (US)

(72) Inventors: Lauri Niskanen, Oulu (FI); Seppo Rousu, Oulu (FI); Juha Valtanen, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 152 days.

(21) Appl. No.: 14/251,160

(22) Filed: Apr. 11, 2014

(65) Prior Publication Data

US 2014/0219141 A1    Aug. 7, 2014

Related U.S. Application Data

(60) Continuation of application No. 13/851,244, filed on Mar. 27, 2013, now abandoned, which is a division of application No. 13/347,164, filed on Jan. 10, 2012, now Pat. No. 8,660,041.

(30) Foreign Application Priority Data

Jan. 9, 2012 (GB) .................................. 1200229.1

(51) Int. Cl.
*H04L 5/00* (2006.01)
*H04B 1/44* (2006.01)
(Continued)

(52) U.S. Cl.
CPC .. *H04B 1/44* (2013.01); *H04B 1/48* (2013.01); *H04J 3/02* (2013.01); *H04L 5/14* (2013.01)

(58) Field of Classification Search
CPC ..................................................... H04L 5/1469
USPC .................................................. 370/278, 297
See application file for complete search history.

(56) References Cited

U.S. PATENT DOCUMENTS 5,444,864 A    8/1995  Smith
5,483,679 A    1/1996  Sasaki
(Continued)

FOREIGN PATENT DOCUMENTS

EP    0496498    7/1992
EP    1503517    2/2005
(Continued)

OTHER PUBLICATIONS

Notice of Allowance for U.S. Appl. No. 13/851,244 dated Apr. 14, 2014.
(Continued)

*Primary Examiner* — Wanda Z Russell
(74) *Attorney, Agent, or Firm* — Foley & Lardner LLP; Christopher J. McKenna; Daniel E. Rose

(57) ABSTRACT

Embodiments provide a method and apparatus for performing time division duplex communication, such as may be performed over a wireless communications network. In the embodiments a first circuit pathway is used to transmit a first radio frequency signal in a transmission mode and a second circuit pathway is used to receive a second radio frequency signal in a reception mode. In the reception mode, the first radio frequency signal is switched to an alternate circuit pathway. This may be performed by a radio frequency integrated circuit or by other control circuitry. Switching to an alternate circuit pathway reduces leakage of the first radio frequency signal into the second radio frequency signal.

18 Claims, 16 Drawing Sheets

(51) Int. Cl.
*H04J 3/02* (2006.01)
*H04B 1/48* (2006.01)
*H04L 5/14* (2006.01)

(56) References Cited

U.S. PATENT DOCUMENTS

| | | | |
|---|---|---|---|
| 6,226,276 B1 | 5/2001 | Na | |
| 6,356,536 B1 | 3/2002 | Repke et al. | |
| 2002/0176375 A1 | 11/2002 | Barabash et al. | |
| 2006/0040620 A1 | 2/2006 | Jung et al. | |
| 2006/0063485 A1* | 3/2006 | Gainey | H04B 7/15542 455/15 |
| 2006/0089107 A1* | 4/2006 | Domino | H04B 1/005 455/78 |
| 2007/0082617 A1 | 4/2007 | McCallister | |
| 2007/0111682 A1 | 5/2007 | Mucke | |
| 2007/0111686 A1* | 5/2007 | Lee | H03F 1/0211 455/127.3 |
| 2009/0130989 A1* | 5/2009 | Rousu | G01R 29/0835 455/73 |
| 2009/0197560 A1 | 8/2009 | Rofougaran | |
| 2009/0253385 A1 | 10/2009 | Dent et al. | |
| 2009/0285135 A1* | 11/2009 | Rousu | H04B 1/0057 370/297 |
| 2009/0286501 A1 | 11/2009 | Rousu et al. | |
| 2010/0040184 A1* | 2/2010 | Haralabidis | H04B 1/0475 375/373 |
| 2010/0202325 A1 | 8/2010 | Poulin et al. | |
| 2011/0249576 A1* | 10/2011 | Chrisikos | H01Q 1/243 370/252 |

FOREIGN PATENT DOCUMENTS

| | | |
|---|---|---|
| EP | 1978645 | 10/2008 |
| GB | 2317760 | 4/1998 |
| WO | WO-2004/088865 | 10/2004 |
| WO | WO 2005/104390 | 11/2005 |

OTHER PUBLICATIONS

PCT International Search Report dated Jul. 3, 2013 for PCT/IB2013/050157.
UKIPO Search Report under Section 17 dated Nov. 7, 2012 which is issued in a related British Application GB1219203.5.
Non-Final Rejection for U.S. Appl. No. 13/347,164 mailed Apr. 11, 2013.
Final Rejection for U.S. Appl. No. 13/347,164 mailed Jul. 30, 2013.
Notice of Allowance for U.S. Appl. No. 13/347,164 mailed Nov. 8, 2013.
UKIPO Search Report under Section 17 dated May 3, 2012, which is issued in a related British Application GB1200229.1.

* cited by examiner

METHOD AND APPARATUS FOR TIME DIVISION DUPLEX COMMUNICATION

CROSS REFERENCE TO RELATED APPLICATIONS

This application is a Continuation of co-pending U.S. patent application Ser. No. 13/851,244, entitled "Method and Apparatus for Time Division Duplex Communication," filed Mar. 27, 2013; which is a Divisional of U.S. patent application Ser. No. 13/347,164, entitled "Method and Apparatus for Time Division Duplex Communication," filed Jan. 10, 2012, which claims the benefit under 35 U.S.C. §119(a) and 37 CFR §1.55 to UK Patent Application No. 1200229.1, filed on Jan. 9, 2012; each of which are hereby incorporated by reference.

TECHNICAL FIELD

The present invention relates to wireless communication using time division duplex (TDD) methods. In particular, the present invention relates to a method and apparatus for transmitting and receiving radio frequency signals.

BACKGROUND

TDD methods enable electronic devices to communicate with network devices in both receive (RX) and transmit (TX) directions. This is achieved by dividing a radio frequency communications channel into a number of time slots and rapidly alternating activity between transmission and reception. Hence, full duplex, i.e. simultaneous two way communication, can be emulated with a half duplex or simplex transceiver, i.e. a device that is limited to one way communication at any one time. Examples of TDD systems comprise: Time Division-Code Division Multiple Access (TD-CDMA) implementations of the Universal Mobile Telecommunications System (UMTS), including both synchronous and non-synchronous specifications; Time Division-Long Term Evolution (TD-LTE) communications systems; Advanced eXtended Global Platform (AXGP) networks; and Institute of Electrical and Electronic Engineers (IEEE) standard 802.16 (so-called 'WiMAX®').

In TDD methods the use of a common frequency for both transmission and reception operations can lead to interference problems. For example, leakage of a local signal for transmission may disrupt reception of a radio frequency signal in a reception mode. This is particularly problematic when advanced modulation schemes are used that are more susceptible to noise. If local leakage is too high it may be difficult to provide successful Direct Current (DC) compensation during a reception operation, which can lead to degradation of data throughput or loss of a data connection. Different data classes, for example as specified by 3rd Generation Partnership Project (3GPP) standards, may require different signal to noise ratios (SNRs) and/or signal interference sensitivities and so the degradation of data throughput effect of leakage may vary according to said classes.

A number of solutions to the problem of interference in TDD systems have been proposed. In certain Global System for Mobile Communication (GSM) systems guard bands are used between transmit and receive time slots to allow appropriate components to be switched on and off without settling effects. However, the use of guard bands restricts the data rates for communication.

U.S. Pat. No. 5,483,679 describes a radio communication apparatus that uses a common carrier frequency for transmission and reception operations, which are selectively carried out in the apparatus. Three local oscillators are used: a modulation local oscillator, a common local oscillator and a subsidiary reception local oscillator. During a reception operation, a frequency divider coupled to the modulation local oscillator is put into an inactive state to isolate the modulating local oscillator and the modulator.

US 2009/0286501 A1 describes a multi-radio device that may operate in a TDD mode. Pairs of frequency adjustable diplexers are arranged in series on transmission and reception paths and are configured by control signals based on a particular use case.

There is a need for an improved apparatus and method for time division duplex communication that minimizes interference and leakage between transmit and receive radio frequency signals.

SUMMARY

In accordance with an embodiment, there is provided a method of controlling a time division duplex (MD) transceiver, the TDD transceiver comprising a first circuit pathway for transmission and a second circuit pathway for reception, the method comprising, in a transmission mode, using the first circuit pathway for transmission of a first radio frequency signal and in a reception mode, using the second circuit pathway for reception of a second radio frequency signal, wherein, in the reception mode, an alternate circuit pathway to the first circuit pathway is used for the first radio frequency signal, the alternate circuit pathway having a higher attenuation factor, with respect to the second circuit pathway, than the first circuit pathway.

In accordance with an embodiment, there is provided apparatus for time division duplex (TDD) communication comprising a first circuit pathway for transmission of a first radio frequency signal, a second circuit pathway for reception of a second radio frequency signal, a third circuit pathway having a higher attenuation factor, with respect to the second circuit pathway, than the first circuit pathway; and control circuitry for switching the first radio frequency signal from the first circuit pathway to the third circuit pathway during a reception mode.

Further features and advantages of the invention will become apparent from the following description of preferred embodiments of the invention, given by way of example only, which is made with reference to the accompanying drawings.

DETAILED DESCRIPTION

Figure 1:
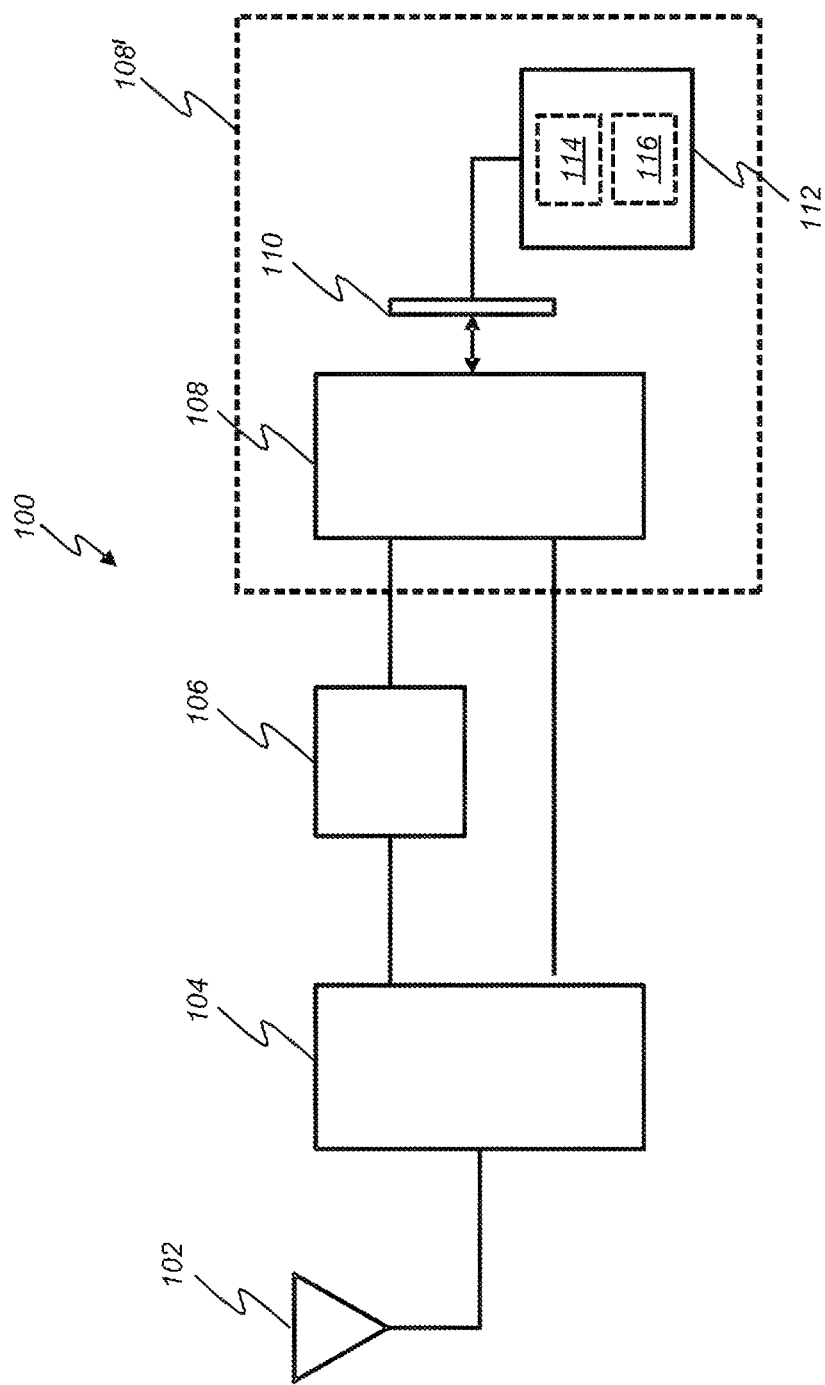
FIG. 1 is a schematic diagram showing a portion of a first exemplary transceiver.

FIG. 1 shows at least a portion of a first exemplary transceiver 100 adapted to transmit and receive radio frequency communications according to conventional TDD methods. An antenna 102 is arranged to transmit a first radio frequency signal in a transmission mode and to receive a second radio frequency signal in a reception mode. The antenna 102 is coupled to a front end module (FEM) 104. The FEM 104 may comprise one or more switching, filtering, amplification, power and/or control components, such as switches, bandpass filters, low noise amplifiers, regulators, control interface and digital logic. Alternatively, a radio frequency (RF) front end may be implemented with discrete components and/or other modules. According to the architecture that is used for a particular implementation additional components may be included within the FEM as necessary. The FEM 104 is coupled to a power amplifier 106 on a first circuit pathway that may be used for the transmission of a first radio frequency signal. The power amplifier 106 is arranged to amplify the first radio frequency signal to a suitable power level for transmission via the antenna 102. In some embodiments, power amplifier features may be incorporated with the FEM 104. Certain embodiments may also have other components that are not shown in FIG. 1, for example intermediate filter components, antenna resonance tuning circuitry, antenna matching circuitry, envelope tracking circuitry, power management circuitry, alternate radio path components, alternate radio access technology path components, matching components, filtering components, baluns, isolators, etc. The power amplifier 106 is coupled to a radio frequency integrated circuit (RFIC) 108 on the first circuit pathway. A second circuit pathway further couples the FEM 104 to the RFIC 108. The second circuit pathway is used for reception of a signal, which does not require the use of power amplifier 106. The second circuit pathway may comprise a differential circuit pathway, i.e. two physical connections for the reception of differential signals. The RFIC 108 is, in turn, coupled to one or more electronic subsystems via interface 110.

In FIG. 1, one component, a voltage-controlled oscillator (VCO) 112, is shown coupled to the RFIC 108 via the interface 110. In certain implementations, the VCO 112 may alternatively form part of the RFIC 108, i.e. be integrated within the RFIC 108, or be directly coupled to the RFIC 108. In some implementations, a system or RFIC may have at least two or more VCOs for local signal generation purposes, with two VCOs often being used. For example, FIG. 1 shows a first VCO 114 for use in signal transmission operations and a second VCO 116 for use in signal reception operations. Even though these two VCOs are shown to be external to the RFIC 108 in FIG. 1, in some embodiments they may be internal to the RFIC 108. For example, components 108, 110, 114 and 116 may form a single chip or module 108'. In other embodiments, a generated VCO signal may be shared between transmission and reception chains. The general circuit arrangement that is used may depend on a particular radio frequency (RF) architecture. For example, some architectures, and by extension some embodiments, may be capable of, amongst others, one or more of: diversity reception; downlink (i.e. to the transceiver) multiple-input multiple output (MIMO), and/or diversity transmission; uplink (i.e. from the transceiver) MIMO; and downlink carrier aggregation and/or uplink carrier aggregation. These features typically require additional electronic components that are not illustrate in FIG. 1. Some RF architectures may also use two or more RFICs, as opposed to the single RFIC illustrated in FIG. 1. In some embodiments, the RFIC 108 may comprise further functionalities, for example: short-range wireless communication (e.g. Bluetooth® or ZigBee® standards, WLAN 802.11 standards, etc.) and time-of-arrival-related positioning systems (e.g. a receiver for a Global Navigation Satellite System (GNSS)). These possible variations may also apply to any of the additional examples and embodiments described below.

Figure 2:
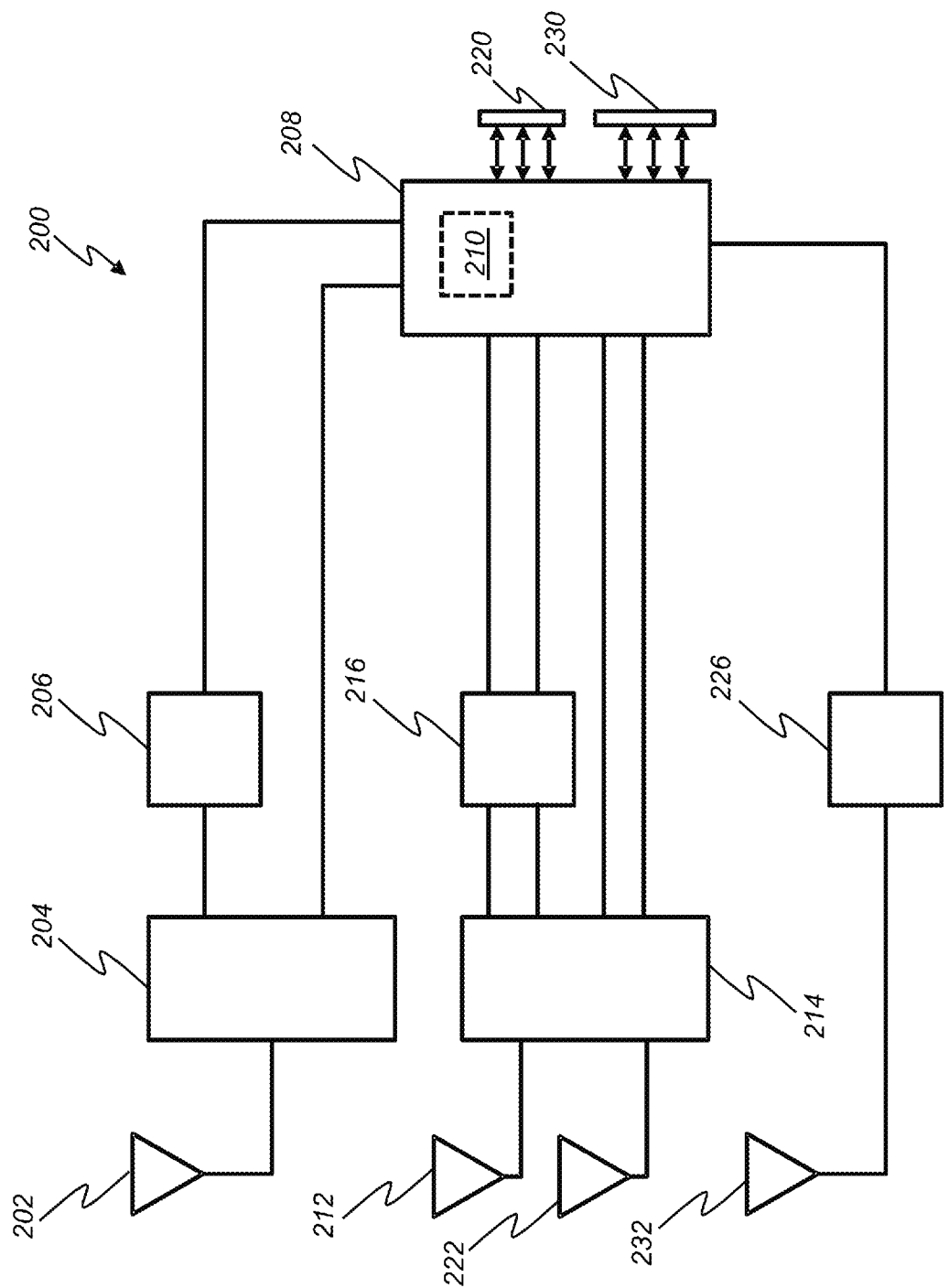
FIG. 2 is a schematic diagram showing a portion of a second exemplary transceiver.

FIG. 2 shows at least a portion of a second exemplary conventional transceiver 200. The second exemplary transceiver 200 may be considered to be a more complex version of the first exemplary transceiver 100. The second exemplary transceiver 200 may be used to transmit and receive a variety of radio frequency signals, for example one or more signals that conform to different signaling standards or one or more signals that use different frequency bands. The illustrated portion of the second exemplary transceiver 200 comprises a first antenna 202, a first FEM 204 and a first power amplifier 206. These components are similar to components 102, 104 and 106 of FIG. 1. FIG. 2 further shows a RFIC 208 that is coupled to the power amplifier 206 via a first circuit pathway and that is coupled to the first FEM 204 via a second circuit pathway. Unlike FIG. 1, the RFIC 208 of FIG. 2 is further coupled to a second antenna 212, a third antenna 222 and a fourth antenna 232. The second antenna 212 and the third antenna 222 are coupled to a second FEM 214. The second FEM 214 may be similar to the first FEM 204. The second FEM 214 is arranged to provide one or more of switching, filtering, amplification, power and/or control components for transmission and reception using the second and third antennas 212, 222. Components within the second FEM 214 may be shared between the second and third antennas 212,222, e.g. using one or more switches, one or more frequency selectable components and/or one or more frequency tunable components. Alternatively, components within the second FEM 214 may be associated with a particular one of the second and third antennas 212, 222, e.g. the second antenna 212 may have a dedicated filter that is not used by the third antenna 222. In certain implementations a combination of these approaches may be used, e.g. a mix of dedicated and shared components may be used.

In certain embodiments, antenna 212 and 222 may be selectively controlled. For example, one or more of antenna 212 and 222 may be selected for operational use based on, amongst others, one or more of the following: a particular interference scenario; a particular operational use case, e.g. in a mobile device with moveable features, whether hinged, slideable or clam-shell components are in a particular position such as open or closed; one or more applications that are currently active, e.g. loaded into memory and/or being processed by a processor of a device; and the state of a display and/or a touch-display. Similar selective control may also be applied to other antenna and/or FEM combinations, including combinations that are not shown in FIG. 2 for clarity.

The second FEM 214 is coupled to a second power amplifier 216 via a third and fourth circuit pathway. In a similar manner to the second FEM 214, the second power amplifier 216 may comprise shared and/or dedicated components for the amplification of radio frequency signals. The third and fourth circuit pathways may be respectively used to transmit a radio frequency signal to the second and third antennas 212, 222. Alternatively, the second FEM 214 may comprise switching components such that each of the third and fourth circuit pathways may be used to transmit a radio frequency signal via one or more of the second and third antennas 212, 222. The second power amplifier 216 is further coupled to the RFIC 208 via two couplings that respectively form part of the third and fourth circuit pathways. Similarly, the second FEM 214 is also coupled to the RFIC 208 via fifth and sixth circuit pathways that may be used to receive a signal from the second and third antennas 212, 222. Similarly to FIG. 1, the fifth and sixth circuit pathways may comprise differential circuit pathways. Finally, in FIG. 2, a fourth antenna 232 is coupled to filter 226, which is in turn coupled to the RFIC 208. In some embodiments, filter 226 may be a FEM that provides support for special-purpose operational frequencies in transmission and/or reception. Antenna 232 may also be an antenna system providing associated special-purpose functionalities. The fourth antenna 232 and filter 226 may be solely used for one of reception or transmission. For example, the fourth antenna 232 may comprise a diversity antenna for use in a diversity scheme and/or MIMO operation. The arrangement shown in FIG. 2 is exemplary; different combinations and numbers of antenna, power amplifiers and FEMs may be provided for different implementations and/or according to special-purpose requirements from different radio access technologies.

The RFIC 208 in FIG. 2 comprises at least one integrated VCO 210. The at least one VCO 210 may comprise a shared VCO for transmission and reception or two separate VCOs for transmission and reception. In other variations, one or more VCOs may be coupled to the RFIC 208, for example in the manner of VCOs 114 and 116 in FIG. 1. In many implementations, VCOs that are implemented in an integrated manner are preferred. The at least one VCO 210 is arranged to provide a local frequency signal for use by the RFIC 208, e.g. for use in transmitting a data signal or receiving a data signal. In this case, 'local' is taken to mean local to or close to the circuit components shown in FIG. 2, as opposed to frequency signals that may originate from outside the circuit components of FIG. 2, such as those from alternate transmitters. The RFIC 208 may comprise one or more synthesizers arranged to use the local frequency signal from the at least one VCO 210 so as to either generate a modulated radio frequency signal for transmission or to process a received radio frequency signal, for example for use in demodulation. A further description of the processes that may be performed by the RFIC 208 is set out later below with respect to FIG. 9. The RFIC 208 is also coupled to a baseband subsystem 220 that is arranged to provide a baseband signal for modulation and a power management subsystem 230 that is arranged to provide power to components with the RFIC 208 and/or one or more of the other components shown in FIG. 2. Practical implementations may comprise additional control components and signal pathways that are not shown in the Figures; such features have been omitted for clarity in the present examples. The components of FIG. 2, and other examples and embodiments described herein, may further be provided as separate components, as an integrated system in package (SIP) module, or as a mixture of coupled chip systems.

Figure 3A:
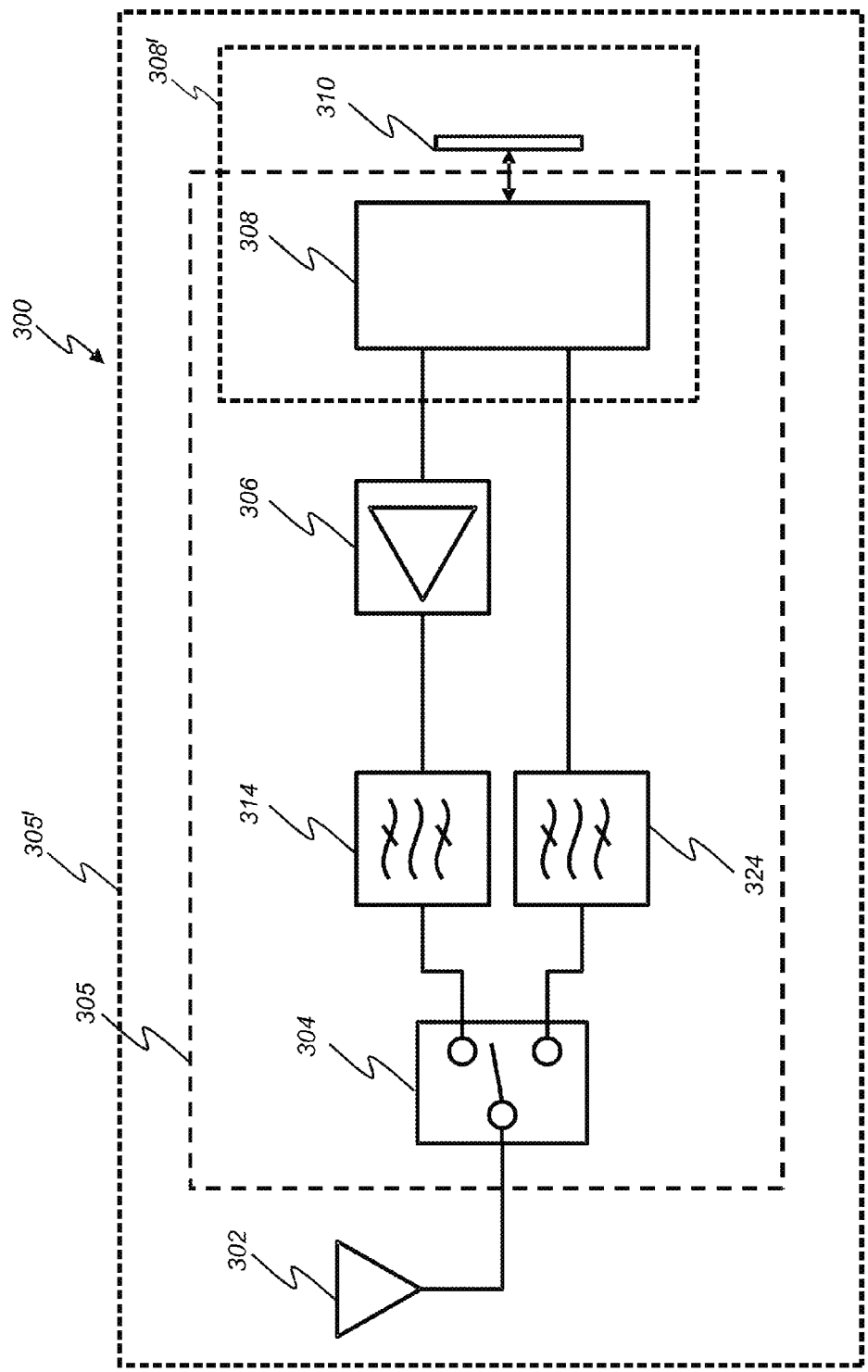
FIG. 3A is a schematic diagram showing a first set of components that may be used to implement the portion of the first exemplary transceiver.

FIG. 3A shows an exemplary implementation 300 based on the first conventional transceiver 100 of FIG. 1. An antenna 302 is coupled to a switch 304. The switch 304 is coupled to at least two circuit pathways: a first pathway for transmission comprising a first filter 314 and a power amplifier 306; and a second pathway for reception comprising a second filter 324. Both the power amplifier 306 and the second filter 324 are coupled to a RFIC 308, i.e. the first and second circuit pathways are each coupled to the RFIC 308. The RFIC is coupled to one or more subsystems 310, which may comprise a VCO. The RFIC 308 and subsystem 310 may be integrated in a single chip 308' in some implementations. The switch 304 and the first and second filters 314, 324 may comprise components implemented within a FEM. The switch may have two or more modes according to implementation. As an example, the implementation 300 may form part of a TD-LTE or AXGP transceiver. The components 304, 306, 308, 314 and 324 may be integrated into a single chip or SIP module, for example as illustrated by boundary 305 in FIG. 3A. Any number of components may be included in such a package, e.g. antenna 302 could also be incorporated in a system in package (SiP) 305', depending on the implementation. For clarity the boundaries 305, 305' and 308' are not shown in FIGS. 3B to 3D.

Figure 3B:
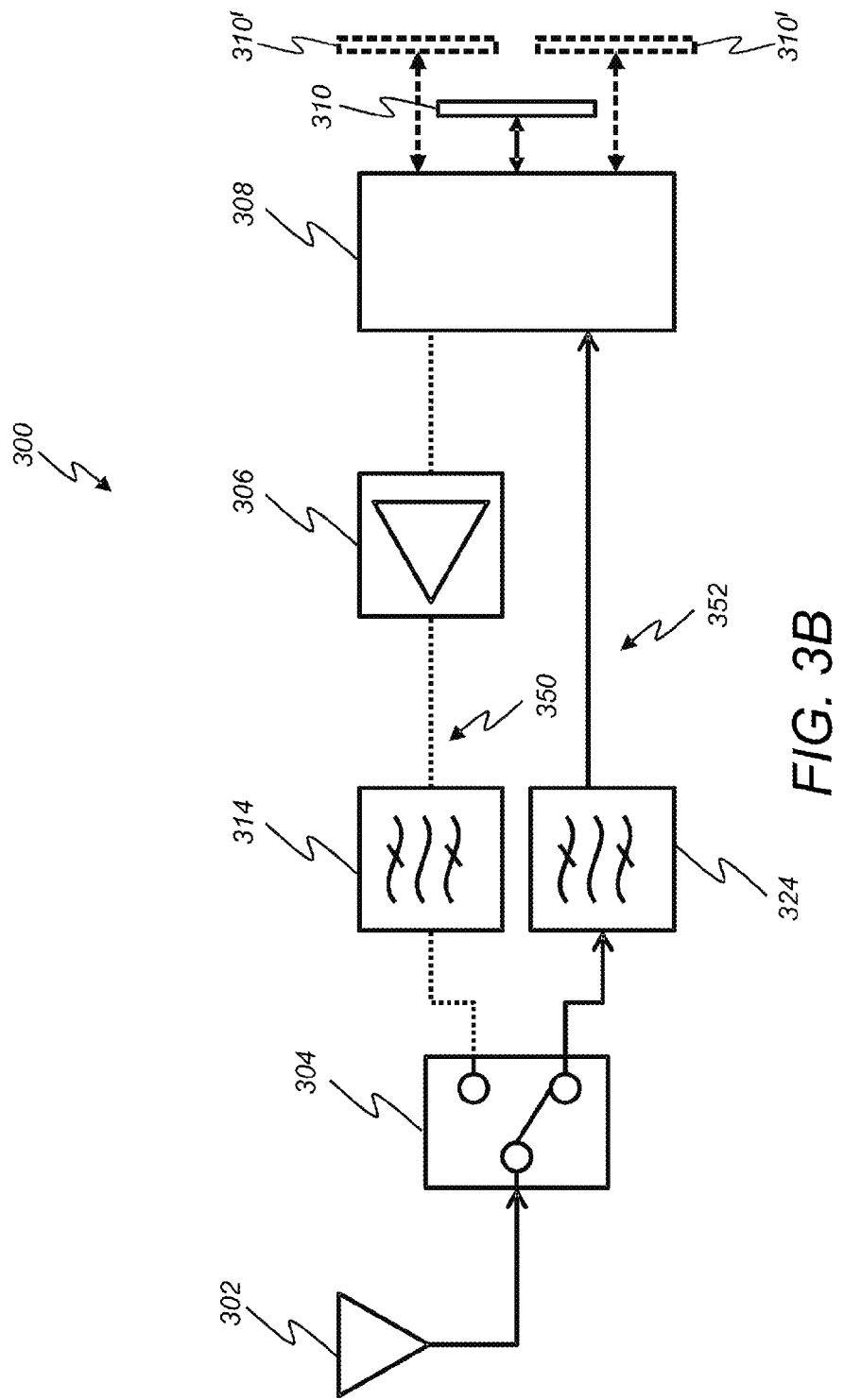
FIG. 3B shows a receive operation using the first set of components of FIG. 3A.

FIG. 3B shows a comparative receive operation using the implementation 300 of FIG. 3A. In this example, it is assumed that the transition time between a transmission mode and a reception mode is much larger than a settling time of an oscillator and/or synthesizer generating a radio frequency signal for transmission. The settling time is a time taken for a particular component, such as an amplifier, a synthesizer or a voltage-controlled oscillator, to provide an output within a specified error of a specified output value. Further detail on settling times is provided below when describing FIGS. 3E and 3F. In the present case, the oscillator and/or synthesizer can be switched off during a reception mode and switched on during a transmission mode, as the transition time is large enough to accommodate a settling time when the components are switched on. In FIG. 3B, showing a reception mode, the generation, by the RFIC 308, of a first local radio frequency signal for transmission has been switched off or deactivated and there is no radio frequency signal present on the first circuit pathway 350. In this reception mode, the switch 304 of FIG. 3B is activated to select the second circuit pathway 352 whereby a signal received by the antenna 302 is directed through the second filter 324 to a reception port of the RFIC 308. For illustration, FIG. 3B also shows further optional subsystems 310'. These subsystems may comprise other external control circuitry, clock circuitry, signal interfaces and/or power lines. Subsystems 310' may interface with either of RFIC 308 or single chip 308. Any number of additional couplings to a variety of integrated packages may be supplied in any of the described examples; these will be omitted from further Figures for clarity.

Figure 3C:
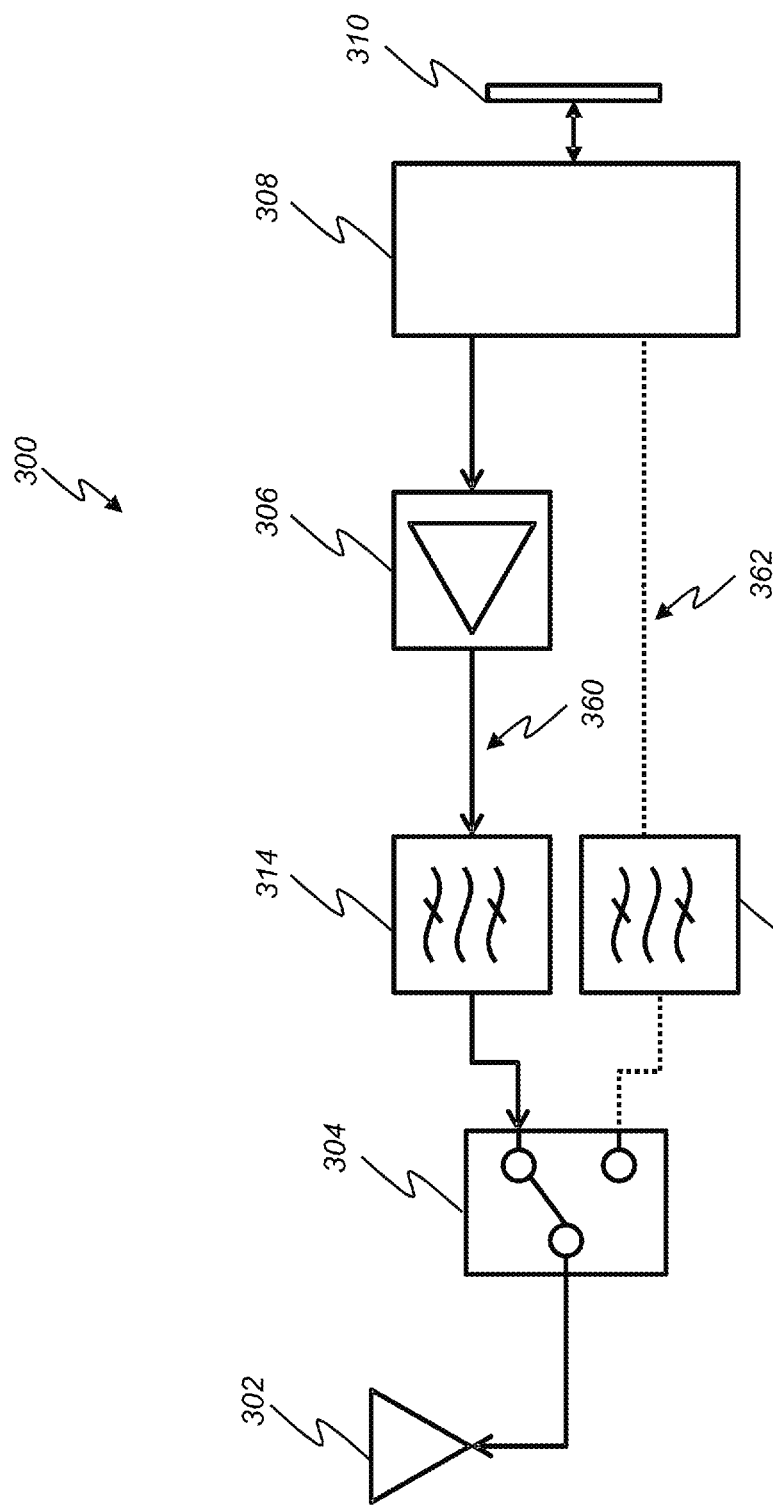
FIG. 3C shows a transmit operation using the first set of components of FIG. 3A.

FIG. 3C shows a transmit operation using the implementation 300 of FIG. 3A. The switch 304 is activated to select the first circuit pathway 360 whereby a local radio frequency signal generated by the RFIC 308 and output on a transmission port is amplified by the power amplifier 306 and filtered by the first filter 314 before being directed through the switch 304 to the antenna 302. In an ideal case, there is no signal present on the second circuit pathway 362 during transmission. In practical implementations there may be a negligible signal present due to finite isolation properties of components within the transceiver and/or other interfering signals, e.g. those from remote sources. In a typical case, as any signal received by the antenna has a lower power than the transmitted signal and the switch 304 is switched to the first circuit pathway 360, the transmitted signal generally masks any received signal. There may also be some leakage signal power from the transmitted signal to the second circuit pathway 362.

Figure 3D:
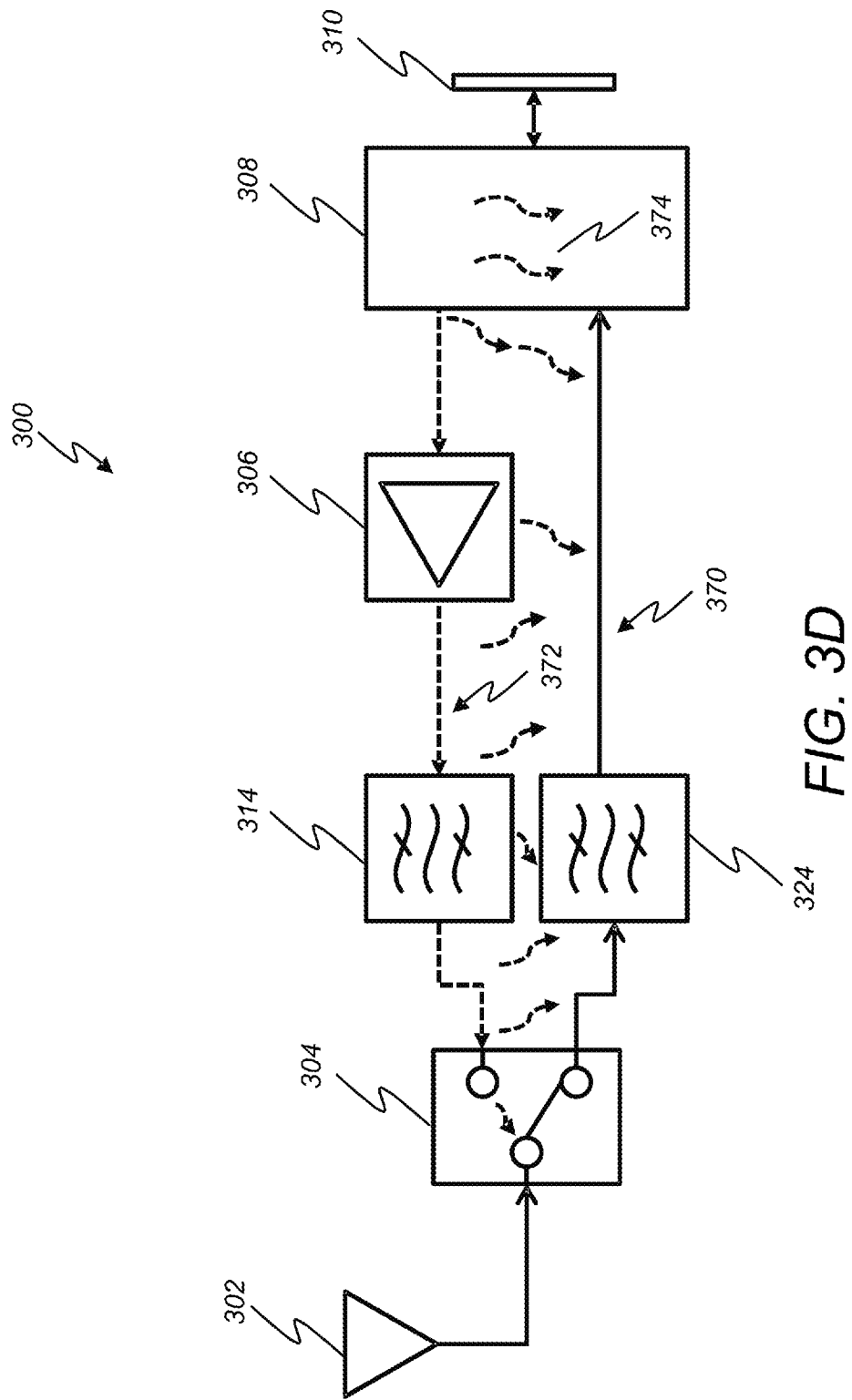
FIG. 3D shows possible signal leakage paths for a receive operation.

FIG. 3D shows a problem of circuit leakage when it is not possible to deactivate the generation of a first local radio frequency signal for transmission during reception, e.g. when it is not possible to switch off the first local radio frequency signal as in FIG. 3B. For example, in certain cases, the switching or transition time between a reception mode and a transmission mode may be much smaller than, or of the same order of magnitude as, the settling time for one or more components used to generate the first radio frequency signal. These circuit components may comprise oscillators, synthesizers, power regulators, controllers, etc. that form part of an RFIC and/or external circuitry. Even though in an ideal case, it would be preferable to disable or deactivate all unnecessary circuit components to achieve power consumption savings, it is may not be possible to deactivate and reactivate the circuit components that generate a local radio frequency signal for transmission in the short time reserved for each of reception and transmission; for example, due to the need for settling time.

Therefore, in FIG. 3D a second radio frequency signal is received via the antenna 302 and directed along the second circuit pathway 370. At the same time a first radio frequency signal is generated by the RFIC 308. As the present transceiver uses TDD methods, the first and second radio frequency signals are functional at a common frequency, i.e. they both have a common frequency component that can lead to interference. In this example, in a reception mode, the first radio frequency signal is present on the first circuit pathway 372 and current leaks onto the second circuit pathway. This interferes with the second radio frequency signal received by the antenna 302.

Figure 3E:
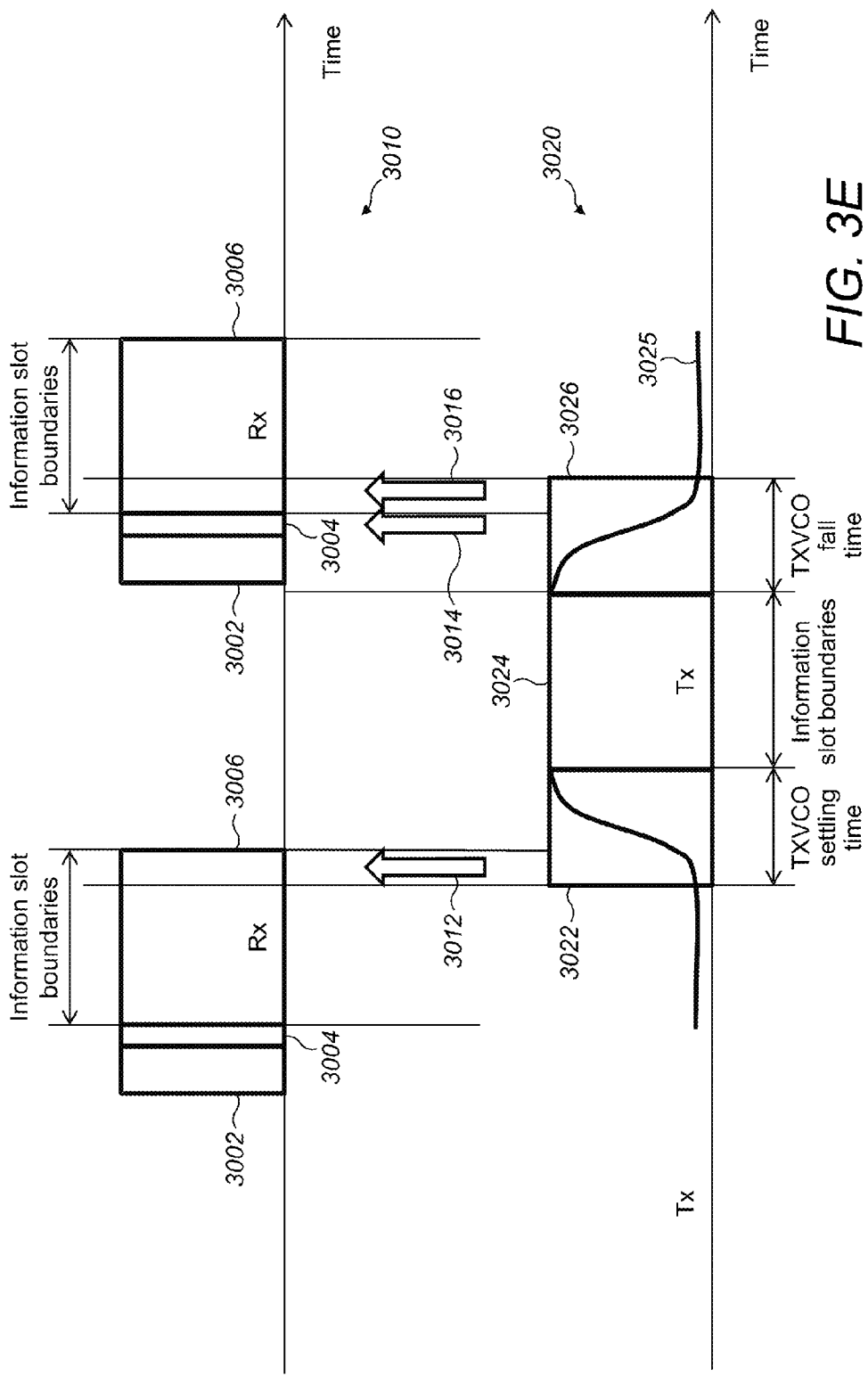
FIG. 3E is a schematic diagram showing how interference between transmit and receive signals can occur when using two voltage-controlled oscillators.

FIG. 3E shows an example of interference that may occur when separate VCOs are used for transmission and reception operations. An upper plot 3010 schematically illustrates time slots for receiving and processing a payload data signal using a first RX-VCO and a lower plot 3020 schematically illustrates the power of a local signal for transmission generated by a second TX-VCO. Two reception periods for a reception mode are shown in the upper plot 3010. Each reception period comprises a first time period 3002, a second time period 3004 and a third time period 3006. The first time period 3002 comprises sequential reception activities that are required to start-up reception components, such as the RX-VCO. This first time period 3002 may also include transmission activities that are required to power-down transmission components, for example receive/transmit switching, transmit RFIC power-down activities and power-amplifier power-down activities. The second time period 3004 comprises reception configuration activities such as configuring gain settings for reception and providing DC offset compensation. The third time period 3006 comprises a reception operation, i.e. the reception of a radio frequency signal comprising information that has been transmitted from a remote transmitter. An exemplary transmission period or it transmission mode is shown in the lower plot 3020. The transmission period comprises: a settling period 3022 for the TX-VCO, which may comprise sequential activities for transmission and activation of the TX-VCO; an information transmission period 3024 wherein a locally-generated radio frequency signal is transmitted to a remote receiver; and a fall time 3026 for the TX-VCO, wherein the TX-VCO returns to an off or reduced activity state. The line 3025 shows an exemplary TX-VCO power level during the transmission period.

Interference between transmit and receive signals may occur in the time periods illustrated in FIG. 3E. For example, as illustrated by arrow 3012, information received during the third time period 3006 may be corrupted by interference caused by the settling period 3022 for the TX-VCO; in particular by the ramping up of the power of a local radio frequency signal for transmission while bits are still being received. As illustrated by arrow 3014, the fall time 3026 of the TX-VCO may lead to interference in the second time period 3004, i.e. the presence of a local radio frequency signal for transmission may interfere with accurate DC offset compensation and gain settings for signal reception. A continued presence of a signal from a TX-VCO in the fall time 3026 may also interfere with the reception of data bits at the beginning of the third time period 3006.

Figure 3F:
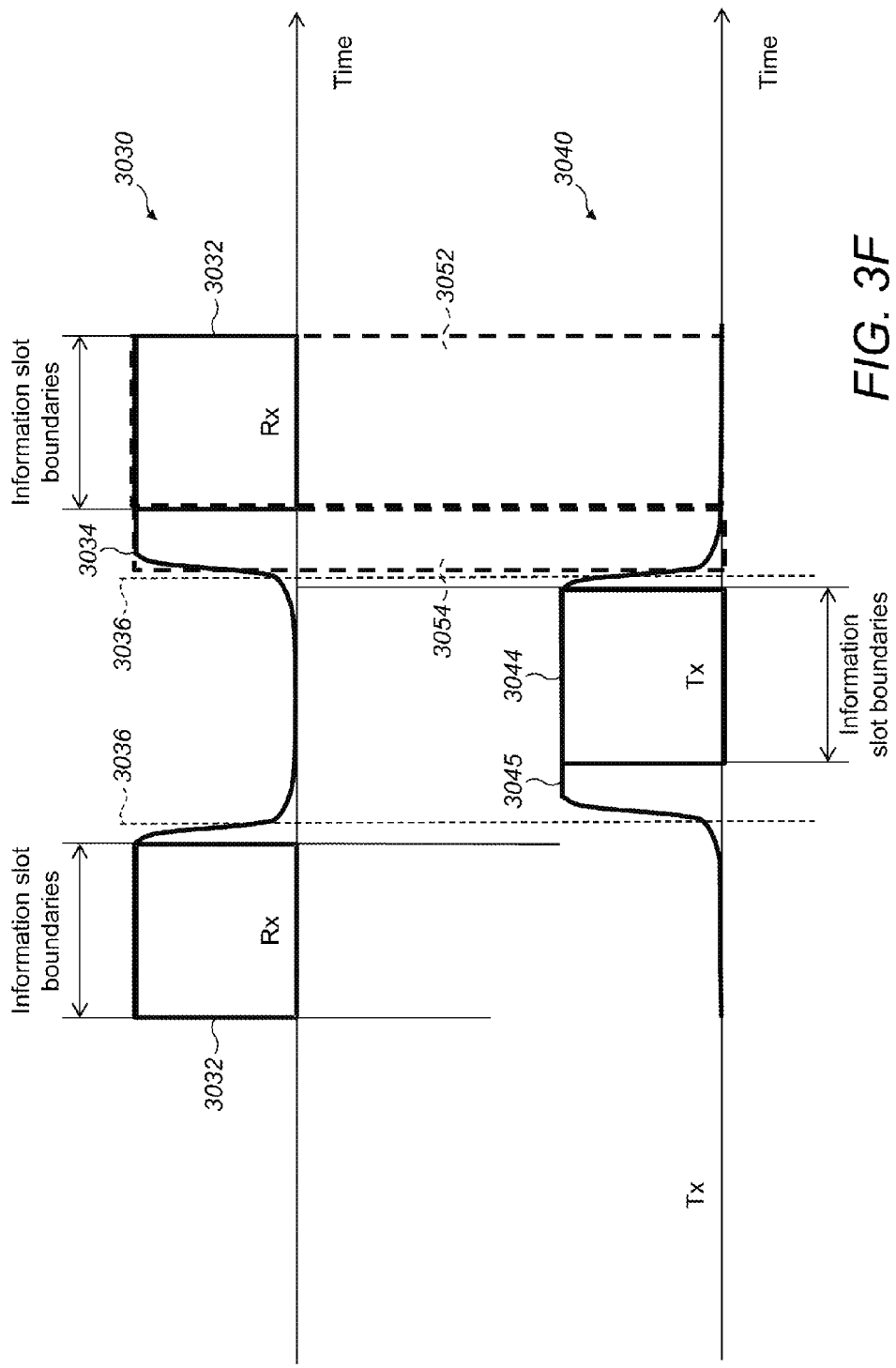
FIG. 3F is a schematic diagram showing how interference between transmit and receive signals can occur when using a shared voltage-controlled oscillator.

FIG. 3F shows a similar example of interference when a VCO is shared between transmission and reception. An upper plot 3030 schematically illustrates time slots for signal reception using a shared VCO, e.g. the time for a reception mode. In time period 3032 a signal generated by the shared VCO is used to receive information from a remote transmitter. At times 3036 the shared VCO is switched between reception and transmission uses. For example, at the start of a transmission mode the shared VCO is switched from a reception use to a transmission use and at the start of a reception mode the shared VCO is switched from a transmission use to a reception use. As is illustrated by line 3045 after the first switching time, shared VCO power for transmission is ramped up ready for time period 3044, in which a signal generated by the shared VCO is used to transmit data bits to a remote receiver. This is shown in the lower plot 3040, which illustrates time periods in a transmission mode. In time period 3034, which occurs before the second repetition of time period 3032, gain settings are configured and DC offset compensation is performed to prepare for reception of a payload data signal.

In the example of FIG. 3F, interference can occur during time block 3054, i.e. the period for DC cancellation and gain adjustment. For example, leakage power from the shared VCO in a transmission mode can lead to an error in a DC offset used for the reception of radio frequency signals from a remote transmitter. Unsuccessful DC offset calculation may then lead to restrictions in reception throughput during time block 3052.

As demonstrated by the above examples, interference from a local radio frequency signal generated for transmission operations may occur at a number of different times. For example, interference may occur: during reception operational phases prior to the receipt of payload data, such as when DC compensation occurs; in an initial payload-data reception period; during the receipt of payload data; at the end or 'tail' of a payload-data reception period; and during reception operational phases after the payload-data reception period. The severity of interference depends at least one of: local interference components; local interference leakage power; local interference phase noise power; local interference harmonic power; local harmonic interference phase noise power; duration of a local rise time; duration of a local fall time; duration of a local settling time; local rise-time transients; local fall-time transients; the power of local intermodulation results; the phase noise power of local intermodulation results; a local ringing-period time; local over-shoot; local residual frequency modulation; local post-tuning drift; and characteristics of a frequency-time profile. Intermodulation results occur when local radio frequency signals used for transmission and reception have a frequency difference (delta). This may be the case when two separate VCOs are used, i.e. one VCO generating a first local radio frequency signal for use in transmission and one VCO generating a second local radio frequency signal for use in reception. In this case the two VCOs may not produce local radio frequency signals at exactly the same frequency. Typically, a VCO frequency is altered in the time domain with automatic frequency correction (AFC). In another case, the TDD architecture may require that transmission and reception have a predefined frequency difference. For example, for interoperability between different radio communication systems there may be a guard frequency range between a TDD transmit-signal and adjacent radio-communication-system reception frequencies, and between a TDD receive-signal and adjacent radio communication system transmission frequencies. Additionally, in any practical implementation an applied VCO signal will not be ideal; for example signal power and/or frequency may not be constant in the time domain when a VCO signal is set to a predefined frequency. Furthermore, when changing a VCO signal from a first frequency to an alternate frequency, the transition may not be ideal; for example, residual signals from the first frequency that have a non-constant power and/or frequency in the time domain may affect the power and/or frequency of the second signal.

In advanced TDD systems, guard periods between a transmit payload and a receive payload are getting shorter. Problems arise when local interference components are present during preparations prior to the reception of payload data, during reception of payload data or within the 'tail' of a period for the reception of payload data. Interfering components may originate from at least local radio frequency signals used in one or more of transmission and reception, i.e. local to the transceiver. For example, leakage may occur through one or more of the switch 304, the power amplifier 306, and the first filter 314, via the transmission port of the RFIC 308 or via the circuit traces defining the coupling between components and/or may occur internally within the RFIC 308 itself. This is illustrated in FIG. 3D using curved dashed arrows 374.

Circuit leakage is a problem in systems that require low noise and interference thresholds. For example, in a TD-LTE implementation, a transmit carrier signal may have a leakage level of $n_1$ dBm (the power ratio in decibels of the measured power reference to one milliwatt) from an RFIC transmission port, a leakage level of $n_2$ dBm from a power amplifier in an off or isolation state, and a leakage level of $n_3$ dBm through an antenna switch. This results in a transmit-signal local leakage level of $N=n_1+n_2+n_3$ dBm, wherein the leakage may be of a first radio frequency signal through local circuit pathways to an RFIC reception port. If a low noise amplifier (LNA) coupled to the RFIC reception port requires a noise level below M dBm, and N>M, then the transmit-signal local leakage is (N−M) dBm too high for a received signal. This can lead to degraded system functionality and performance.

Certain embodiments aim to solve this problem by modifying a first circuit pathway such that a first local radio frequency signal, used for transmission, is attenuated while in a reception mode. In some embodiments, the first local radio frequency signal is alternately routed, prior to the start of a reception operation, from the first circuit pathway to a further circuit pathway. The further circuit pathway is arranged to provide greater attenuation of said local signal when compared to the second circuit pathway, i.e. the amount of local current leakage from the first circuit pathway to the second circuit pathway is greater than the amount of local current leakage from the further circuit pathway to the second circuit pathway. In this context a 'circuit pathway' comprises a route for a current signal. The route may comprise, amongst others, one or more conductive traces, one or more electronic components including switches, filters, amplifiers, programmable terminations, synthesizers, and/or one or more internal port mappings within an integrated circuit. In the latter case, the internal port mappings may comprise selecting one or more of a particular input port on an integrated circuit and selecting a particular output port on an integrated circuit. Certain embodiments will now be described in more detail.

Figure 4:
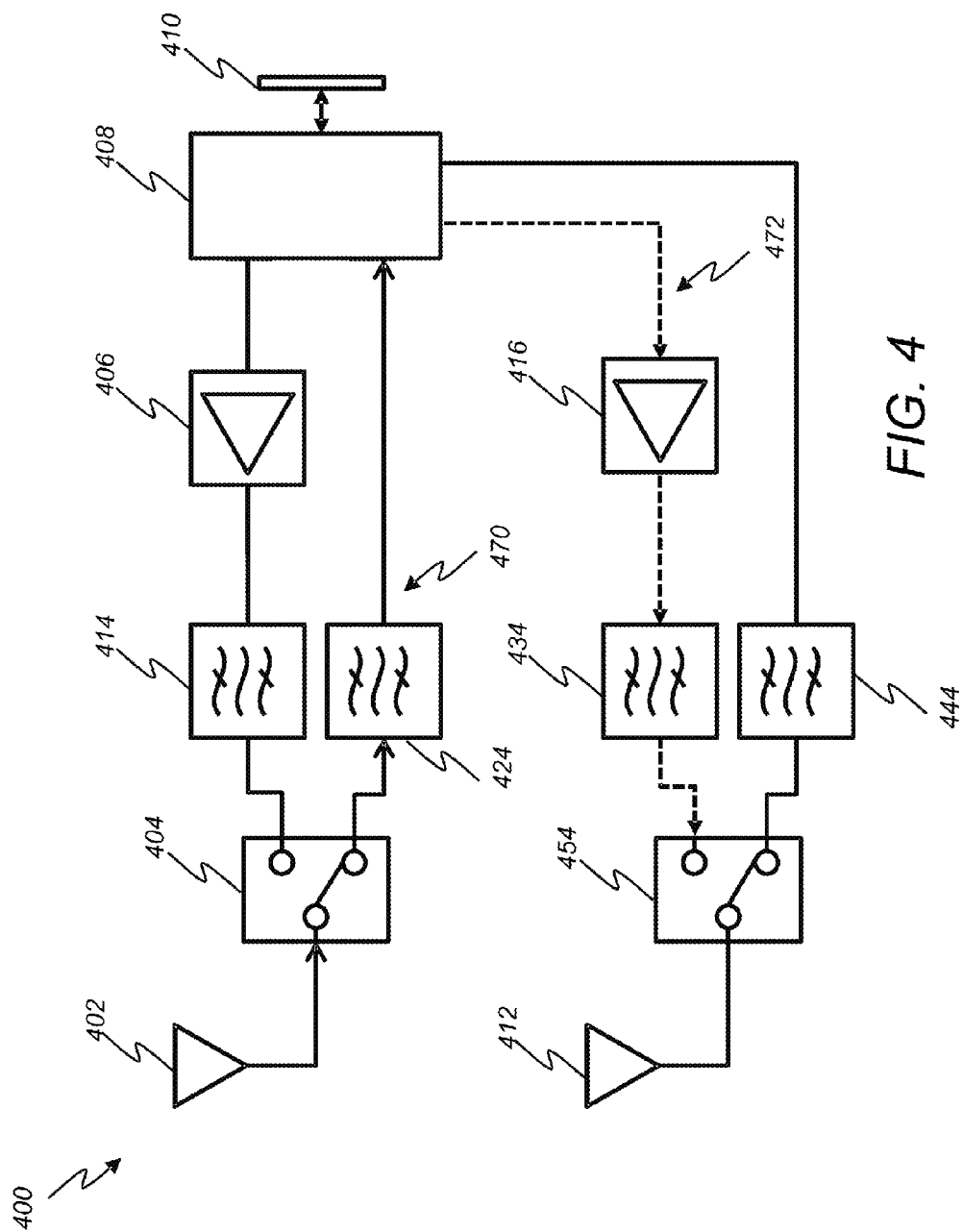
FIG. 4 is a schematic diagram showing a first embodiment.

FIG. 4 shows a first embodiment 400. The first embodiment comprises a first set of components, these comprising: a first antenna 402, a first switch 404, a first filter 414, a second filter 424, and a first power amplifier 406. The first antenna 402 is coupled to the first switch 404. The first switch 404 is coupled to two circuit pathways: a first circuit pathway comprises the first filter 414, which is coupled to the first switch 404, and the first power amplifier 406, which is coupled to the first filter 414 and a first output or transmission port of a RFIC 408 and a second circuit pathway comprises the second filter 424, which is coupled to the first switch 404 and the RFIC 408. This first set of components has a similar function to those of the exemplary implementation 300 described with relation to FIGS. 3A to 3D. A second set of components is also provided, these comprising: a second antenna 412, a second switch 454, a third filter 434, a fourth filter 444, and a second power amplifier 416. The second switch 454 is also coupled to two circuit pathways: a third circuit pathway comprises the third filter 434, which is coupled to the second switch 454, and the second power amplifier 416, which is coupled to the third filter 434 and a second output or transmission port of the RFIC 408; and a fourth circuit pathway comprises the fourth filter 444, which is coupled to the second switch 454 and the RFIC 408. Similarly to the previous Figures the RFIC 408 is coupled to one or more subsystems 410, which may include a VCO. In some embodiments, the RFIC 408 may have one or more integrated VCOs. There may be a dedicated VCO for transmission and a dedicated VCO for reception, each of transmission and reception being part of a TDD operation. Alternatively, a common VCO may be used for both transmit and reception operations. For example, amongst others, any of the VCO configurations of FIGS. 1 and 2 may be used. Similarly, the components of FIG. 4 may be integrated into one or more modules or chip systems.

The first set of components may be used for the transmission and/or reception of wireless signals that meet a first telecommunications standard. For example, amongst others, AXGP or a 3G standard on a chosen frequency band (i.e. a standard that complies with the International Mobile Telecommunications-2000 (IMT-2000) specifications). The second set of components may be used for the transmission and/or reception of wireless signals that meet, amongst others, one of the same telecommunications standard as the first telecommunications standard with carrier aggregation on a common frequency band; the same telecommunications standard as the first telecommunications standard with carrier aggregation at different frequency bands; the same telecommunications standard as the first telecommunications standard with contiguous aggregation on a common frequency band; the same telecommunications standard as the first telecommunications standard with non-contiguous aggregation on a common frequency band; and a second telecommunications standard, for example a 2G standard such as GSM on a chosen frequency band, a 3G standard on a different frequency band, or wireless communications according to IEEE 802.11 family of standards or IEEE 802.16. The second set of components may comprise, for example, components that form one of the transmission or reception chains of FIG. 2, i.e. may be provided in the context of other components sets as part of a large wireless communications circuit.

In the first embodiment, the first circuit pathway is used for transmitting a first radio frequency signal in a transmission mode. The second circuit pathway 470 is used for receiving a second radio frequency signal in a reception mode. The transmission and reception modes are modes of a TDD method. In the reception mode, the first radio frequency signal is switched from the first circuit pathway to the third circuit pathway 472 as shown in FIG. 4. The second switch 454 is controlled so as to be in an off position with regard to the third circuit pathway 472, i.e. switched to the fourth circuit pathway. By switching the second switch 454, in an ideal case, the first radio frequency signal is not leaked via the second antenna 412 in interfering manner. In a practical implementation there may still be some residual leakage present but this is significantly reduced from a conventional application, e.g. any noise present is within the requirements of an input LNA (i.e. below any noise threshold of the LNA as mentioned above). As there is a greater physical distance between the second and third circuit pathways than the first and second circuit pathways, i.e. a greater distance between the respective components and/or conductive traces of the second and third circuit pathways than those of the first and second circuit pathways, the current leakage from the third circuit pathway 472 to the second circuit pathway 470 is less than the current leakage from the first circuit pathway to the second circuit pathway 470. In other words, there is greater attenuation of the first radio frequency signal from the point of view of the second radio frequency signal when the first radio frequency signal is alternately routed along the third circuit pathway 472. Additionally, the signal isolation between antennas 402 and 412 may be high, further reducing the interference. In embodiments with a number of selectively-controlled antennas, a third circuit pathway may be selected to comprise an antenna with an isolation value greater than a predefined threshold. In embodiments with a number of selectively-controlled power amplifier configurations, i.e. circuit pathways comprising one or more power amplifiers configurations, a third circuit pathway may be selected to comprise a power amplifier configuration with an isolation value greater than a predefined threshold.

After the time for the reception mode is complete, the system returns to a transmission mode and the first radio frequency signal is switched back to the first circuit pathway for transmission via the first antenna 402. In a transmission mode, the first switch 404 is in an on state with regard to the first circuit pathway, i.e. is switched to that pathway. The switching of the first radio frequency signal may be achieved by switching output ports of the RFIC, e.g. switching from the first output port to the second output port in the reception mode, or by other switching logic outside of the RFIC. In a particular embodiment, the switching is performed so as to avoid interference during a reception data payload or information bit period, i.e. so as to avoid the previous signal leakage from the first circuit pathway during reception of bits of data. For example, if there is interference present during the end of the reception mode, then reception performance may be degraded. There may be a period between the reception and transmission modes wherein no data is sent or received and the switching may occur in this period.

In one variation, a VCO and/or other components for generating a signal for use in transmission may be switched off for a portion of a reception time period. For example, as shown in FIG. 3E, there may be an overlap between settling and fall times of a TX-VCO and configuration and payload-data reception periods. At least in these periods of overlap where interference would occur in a conventional implementation, an alternate or third circuit pathway is selected as described above. This may be the case where power savings are required and so transmission components are switched off where possible, but where interfering local signals may be present during settling and fall times.

Figure 5:
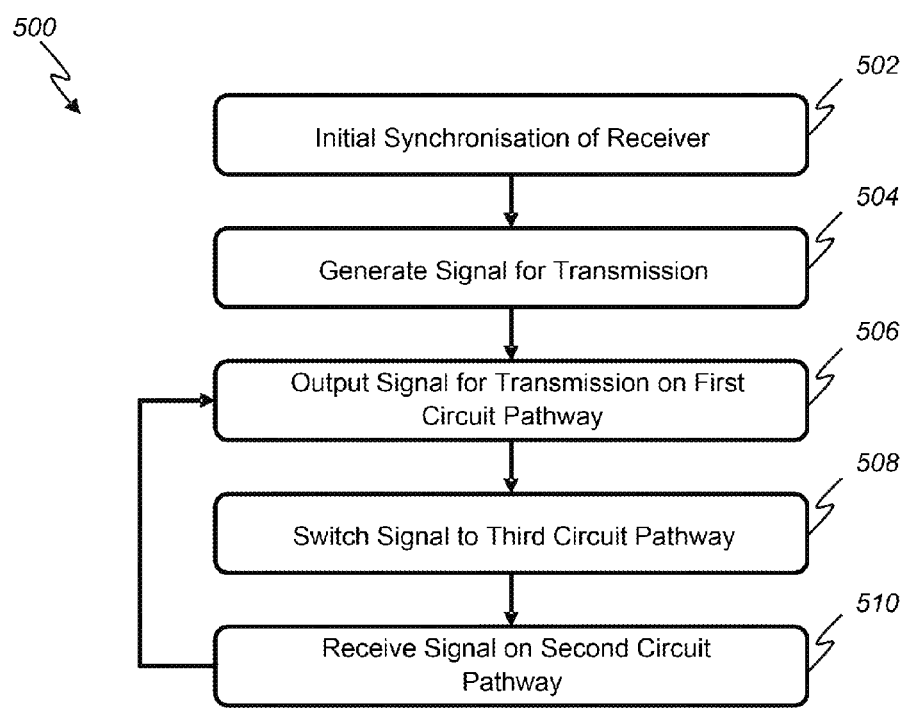
FIG. 5 is a flow diagram showing a method of communicating using a TDD transceiver.

FIG. 5 shows an exemplary method 500 that may be used with the first embodiment. At step 502, in cellular network implementations, initial synchronisation of receiver circuitry is performed based on received control signals. At step 504, a transmission signal is generated. A transmission signal may be generated by modulating a carrier signal with a modulating signal containing data to be transmitted. The modulating signal may be supplied by a baseband subsystem coupled to an RFIC. The carrier signal may be generated based on a local radio frequency signal supplied by a VCO. One or more synthesizers may be used to generate the carrier signal based on a radio frequency signal supplied by a VCO. At step 506, the transmission signal is output for transmission. This is achieved by switching the transmission signal to a first circuit pathway, which may involve with regard to FIG. 4 switching the first switch 404 to the first circuit pathway to allow the transmission signal to be transmitted via the first antenna 402. At step 508, a transition from a transmission mode to a reception mode is made. Responsive to this transition, the transmission signal is switched from the first circuit pathway to a third circuit pathway. The switching may occur during a period when data is not being transmitted or received, for example guard periods between transmission and reception information slots. The switching may be timed such that the transmission signal does not interfere with a received signal, e.g. such that any interference is below an input noise threshold for received-signal processing, in FIG. 4, this may involve switching the second switch 454 to the fourth circuit pathway, i.e. to an off state with respect to the third circuit pathway. At step 510, the RFIC is arranged to receive and process a reception signal that passes along a second circuit pathway, which may involve with regard to FIG. 4 switching the first switch 404 to the second circuit pathway to allow the reception signal to be received via the first antenna 402. Following a time in the reception mode, a transition back to the transmission mode is made, shown in FIG. 5 by the loop from step 510 to 506. Responsive to this transition, the transmission signal is switched back to the first circuit pathway for transmission, e.g. in FIG. 4 switching the first switch 404 to the first circuit pathway to allow the transmission signal to be transmitted via the first antenna 402. At the second iteration of step 504, the modulating signal may be different to that at the first iteration, leading to different data being transmitted. However, throughout steps 506 to 510 the necessary reception and transmission functions of the TDD transceiver are active.

Figure 6:
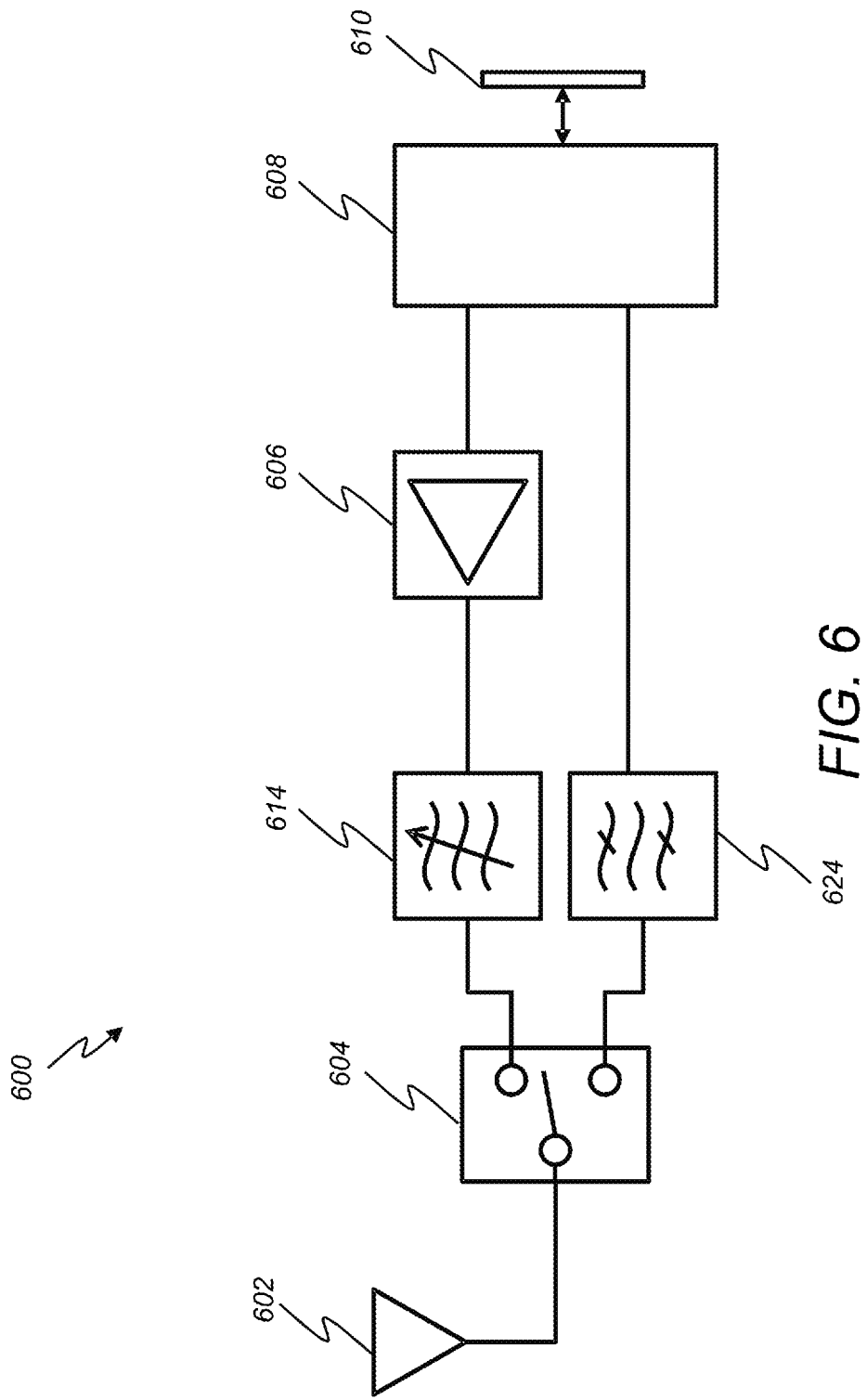
FIG. 6 is a schematic diagram showing a second embodiment.

FIG. 6 shows a second embodiment 600. The second embodiment comprises an antenna 602, a switch 604, a tuneable filter 614, a passband filter 624, and a power amplifier 606. The antenna 602 is coupled to the switch 604. The switch 604 is coupled to two circuit pathways: a first circuit pathway comprises the tuneable filter 614, which is coupled to the switch 604, and the power amplifier 606, which is coupled to the tuneable filter 614 and an output or transmission port of a RFIC 608; and a second circuit pathway comprises the passband filter 624, which is coupled to the switch 604 and the RFIC 608. The RFIC 608 is also coupled to one or more subsystems 610 as before. Components 602, 604, 624, 606, 608, and 610 have a similar function to the similarly numbered components (302, 304, 324, 306, 308, and 310 and 402, 404, 424, 406, 408, and 410) described with regard to FIGS. 3A and 4.

The tuneable filter 614 differs front previous embodiments: in a transmission mode, the tuneable filter 614 is set to a pass band, or a division of a pass band, for a first radio frequency signal to be transmitted via antenna 602, i.e. is set to have similar values as, and/or a similar function to, the first filter 314, 414 in FIGS. 3A and 4. However, in a reception mode, one or more operating parameters of first tuneable filter 614 are modified to attenuate the first radio frequency signal based on one or more control signals. Control signals may originate from a special-purpose controlling unit such as may be present in RFIC 608 or may be provided separately. The control signals may alternatively originate from existing control circuitry. The pass band of the frequency response tuneable filter 614 may be shifted to differ from the frequency range of the first radio frequency signal, thus providing further level of attenuation on the first radio frequency signal. Following this modification, the tuneable filter 614 effectively has a stop band at the local leakage frequency of the first radio frequency signal.

Existing tuneable filters that are used to support multiple TED frequency bands can be used to implement the tuneable filter 614. For example, a mobile communications device may support TDD communication within a first frequency band allocation and within an alternate frequency band allocation; if the first and second radio frequency signals use a first frequency band signal then the tuneable filter can comprise an existing first and alternate frequency band tuneable filter that is switched to an alternate band in a transmission mode to block the first radio frequency signal. In certain embodiments, instead of being switched to an alternate band the first and alternate band tuneable filter may be switched to be out of band, e.g. out of the first frequency band, or switched to a transition band.

The components and methods of the second embodiment may be used in combination with any other embodiment. For example, in one case, the third filter 434 of FIG. 4 comprises a frequency response tuneable filter as described (not shown). Likewise the filters in any of the other embodiments may be selected to be frequency response tuneable filters to increase the attenuation of a transmission signal.

In the exemplary second embodiment 600 shown in FIG. 6 only a transmit filter 614 is tuneable. In a variation of the second embodiment both a transmit filter and a receive filter (not shown) may be tuneable. This allows the transceiver to operate at multiple TDD band allocations, e.g. one or more of LTE band numbers 38, 41 and 40. In a third variation of the second embodiment, filters 614 and 624 may be connected together to form a tuneable TDD/FDD (Frequency Division Duplex) filtering arrangement, for example using LTE band numbers 7, 38, 41, and 40. In this case, the switch 604 may not be needed; for example, when using TDD with FDD both circuit pathways can be coupled to a common node.

Figure 7:
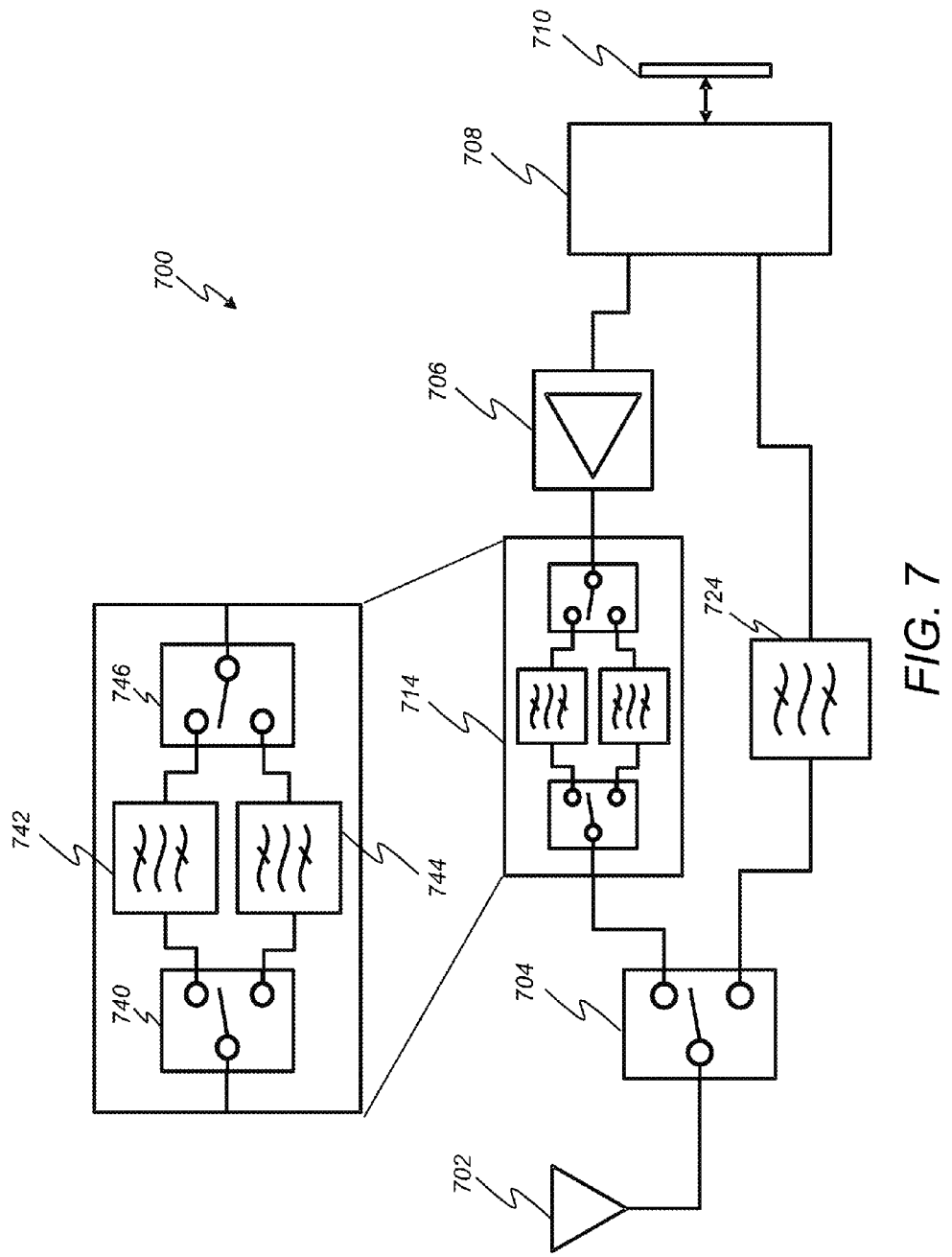
FIG. 7 is a schematic diagram showing a third embodiment.

FIG. 7 shows a third embodiment 700. The third embodiment comprises an antenna 702, a switch 704, a multi-filter arrangement 714 for two or more frequency bands, a passband filter 724, and a power amplifier 706. The antenna 702 is coupled to the switch 704. The switch 704 is coupled to two circuit pathways: a first circuit pathway comprises the multi-filter arrangement 714, which is coupled to the switch 704, and the power amplifier 706, which is coupled to the multi-filter arrangement 714 and an output or transmission port of a RFIC 708; and a second circuit pathway comprises the passband filter 724, which is coupled to the switch 704 and the RFIC 708. The RFIC 708 is also coupled to one or more subsystems 710 as before. Components 702, 704, 724, 706, 708, and 710 have a similar function to the similarly numbered components described with regard to FIGS. 3A, 4 and 6. The multi-filter arrangement may contain band filters, split-band filters, tuneable filters, low pass filters, high pass filters, triplexers and other special purpose components.

The multi-filter arrangement 714 comprises a first filter switch 740, a second filter switch 746, a first sub-filter 742 and a second sub-filter 744. In the example of FIG. 7, the first sub-filter 742 is a filter designed to pass the operational frequency of a first radio frequency signal, i.e. has a similar function to the first filters 314, 414 of FIGS. 3A and 4. The second sub-filter 744 is designed to block the operational frequency of the first radio frequency signal. For example, if the first sub-filter 742 is designed to pass a frequency band centered on a first frequency for transmission, the second sub-filter 744 may be designed to pass a frequency band centered on an alternate frequency and as such block a signal with a frequency band centered on the first frequency. A first circuit pathway may be considered to comprise: the coupling from the switch 704 to the run arrangement 714; the coupling from an input to the multi-filter arrangement 714 to the first filter switch 740; the coupling from the first filter switch 740 to the first sub-filter 742; the coupling from the first sub-filter 742 to the second filter switch 746; the coupling from the second filter switch 746 to an output of the multi-filter arrangement 714; the coupling from the output of the multi-filter arrangement 714 to the power amplifier 706; and the coupling from the power amplifier 706 to the RFIC 708. In some embodiments, a sub-filter such as sub-filter 744 may comprise a branch path that is terminated with a predefined load to ground; for example, there may be no connection from the branch path to the first filter switch 740, such that the second filter switch 746 can switch the circuit pathway to the branch path for a local radio frequency signal originating from the RFIC 708. In some embodiments, a sub-filter may be implemented as a diplexer or a duplexer, wherein one of the nodes of the diplexer or duplexer is terminated with a predefined load to ground.

A second circuit pathway may be considered to comprise: the coupling from the switch 704 to the passband filter 724; and the coupling from the passband filter 724 to the RFIC 708. A third circuit pathway may be considered to comprise: the coupling from the switch 704 to the multi-filter arrangement 714; the coupling from an input to the multi-filter arrangement 714 to the first filter switch 740; the coupling from the first filter switch 740 to the second sub-filter 742; the coupling from the second sub-filter 742 to the second filter switch 746; the coupling from the second filter switch 746 to an output of the multi-filter arrangement 714; the coupling from the output of the multi-filter arrangement 714 to the power amplifier 706; and the coupling from the power amplifier 706 to the RFIC 708. Hence, in a reception mode, the filter switches 740 and 746 are selectively activated so as to switch from a first circuit pathway to a third circuit pathway, the third circuit pathway having a higher attenuation factor or, put another way, the amount of local current leakage from the third circuit pathway to the second circuit pathway being less than the amount of local current leakage from the first circuit pathway to the second circuit pathway. The filter switches 740 and 746 are then further selectively activated to switch back from the third circuit pathway to the first circuit pathway in a transmission mode. Additional filter switches 740 and 746 also add to the attenuation factor.

The components and methods of the third embodiment may be used in combination with any other embodiment. For example, in one case, the third filter 434 of FIG. 4 comprises a two or more band filters as described. In some embodiments, one or more of the band filters may be frequency-response tuneable. Likewise the filters in any of the other embodiments may be selected to be split-band filters to increase the attenuation of a transmission signal.

Figure 8A:
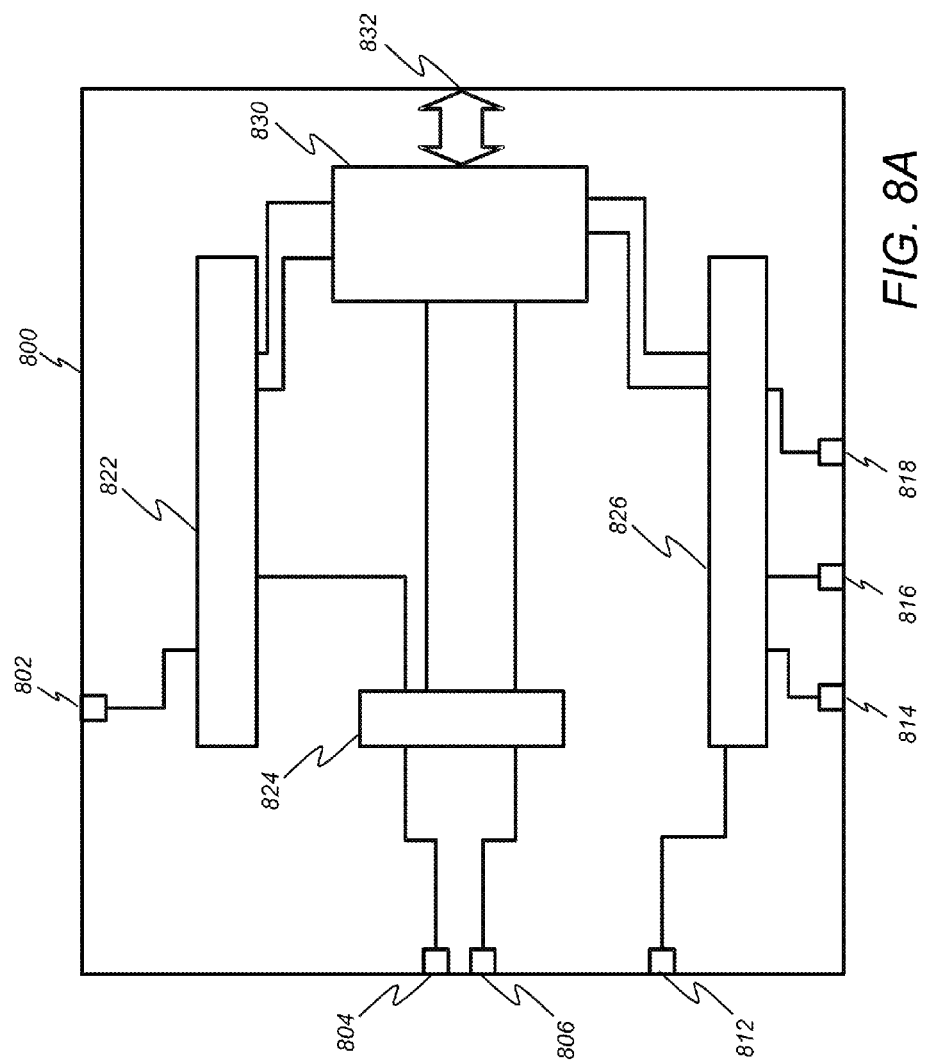
FIG. 8A is a schematic diagram showing an exemplary radio frequency integrated circuit.

FIG. 8A shows a fourth embodiment. The fourth embodiment concerns the function of an 800. RFIC 800 may be used as, for example, RFIC 308, 408, or 608 in any of the previous embodiments. RFIC 800 comprises a number of input and output pins, wherein some of output pins may be regarded as output or transmission ports as previously described. In the example of FIG. 8A three illustrative output pins 802, 804 and 806 are shown. RFIC 800 also comprises a number of input pins, which may be regarded as input or reception ports as previously described, in the example of FIG. 8 four illustrative input pins 812, 814, 816 and 818 are shown. As such the input/output (I/O) pins of the exemplary RFIC 800 are compatible with the arrangement of FIG. 2; however, a different number of pins may be used depending on the implementation. In some implementations, output and input pins may be shared between different frequency band allocations.

The RFIC 800 has a number of functional components, some of which are illustrated in FIG. 8A. These functional components, blocks, and/or elements may be implemented in electronic hardware, using programmable logic or using program code. FIG. 8A shows a first transmission control block 822, a second transmission control block 824, a reception control block 826 and a controller interface 830. The controller interface 830 is coupled to each of the first transmission control block 822, the second transmission control block 824, and the reception control block 826. In FIG. 8A, the first transmission control block 822 is also coupled to the second transmission control block 824. These coupling are exemplary and may differ depending on implementation architecture. The controller interface 830 has a coupling 832 to one or more external components and/or subsystems. For example, coupling 832 may connect the controller interface to one or more of: a VCO; a Voltage Controlled, Temperature Compensated Crystal Oscillators (VCTCXO); one or more global navigation satellite systems, such as the Global Positioning System (GPS) or the Galileo system; a baseband subsystem and a power management subsystem, alternate Radio Access Technology (RAT). Alternatively, these components/functional blocks may be integrated within the RFIC 800. Some TDD architectures may be implemented with a VCO that is shared between transmit and receive paths; other TDD architectures may be implemented with dedicated transmit and receive VCOs.

Figure 9:
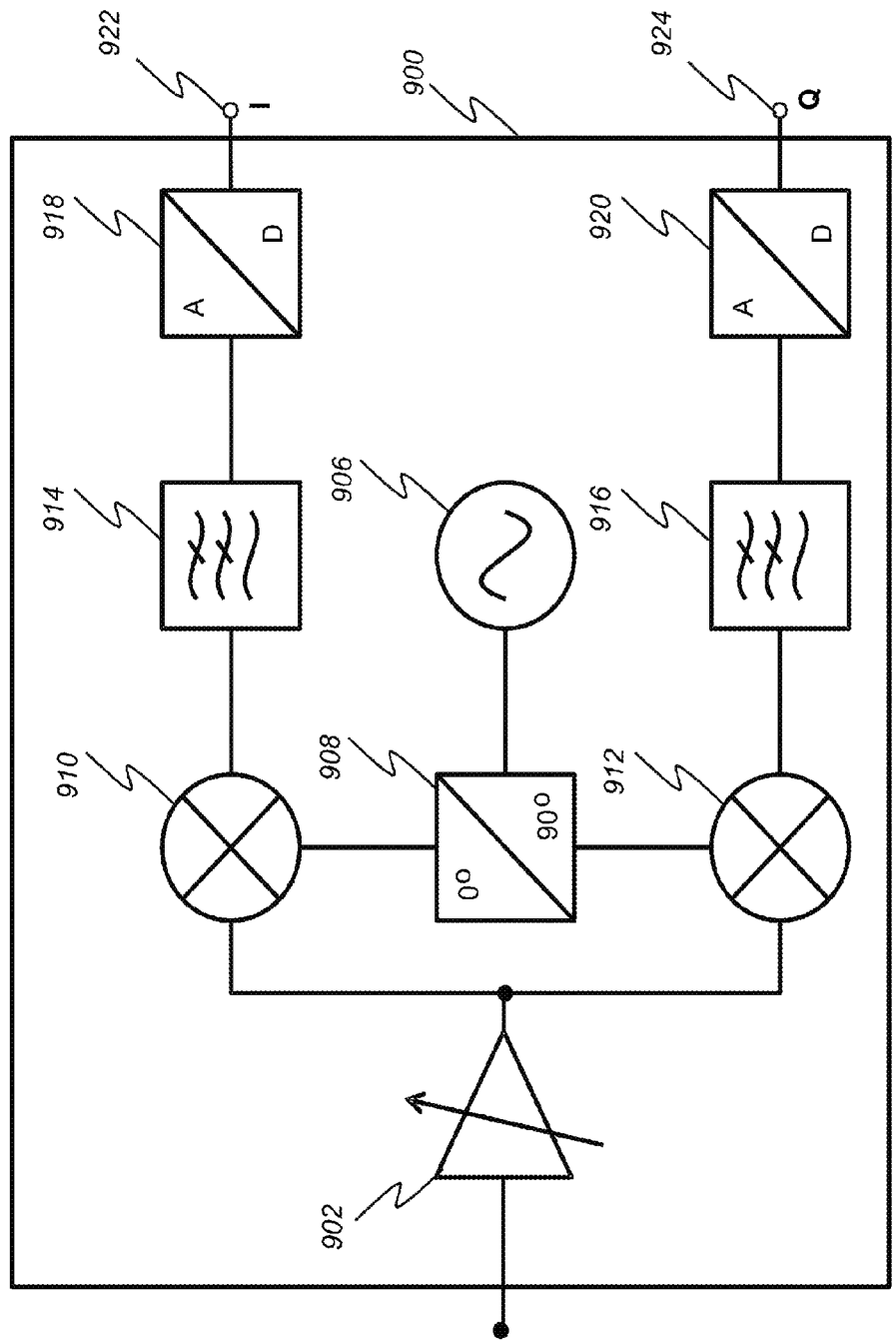
FIG. 9 is a schematic diagram showing exemplary components of the radio frequency integrated circuit.

FIG. 9 shows certain exemplary functionality of the reception control block 826. A received signal from one or more input pins, which may be a differential signal (not shown), is first amplified by LNA 902. Typically, the LNA 902 will have a tolerance limit for a noise level above which reception is impaired. Before signal selection can occur, the frequency of a desired signal may be down-converted by mixing the input signal with a signal generated by local oscillator 906, which may be a local VCO. In some embodiments, a direct conversion receiver converts the desired signal directly to baseband frequency by mixing it with a local oscillator signal of approximately the same frequency as the carrier frequency of the desired signal. The carrier frequency is typically the same carrier frequency used for communication. This has the effect of translating the desired signal to be centred on zero frequency. The local oscillator may comprise a signal generated by one or more on-chip synthesizers based on a signal from an external VCO. In order to extract both the I and Q components, the input signal must be mixed with both the in-phase and quadrature shifted versions of the local oscillator signal, which are generated by quadrature generator 908. The exact phase of the received signal cannot be predicted due to the unknown phase shift that will occur during transmission. Hence, the local oscillator must synchronize with the received signal in order to ensure the necessary phase relationship. This synchronization may be achieved by establishing a phase reference, for example by using a phase locked loop (PLL) or by rotating the signal after down-conversion by digital means. The input signal is mixed with the in-phase local oscillator signal by mixer 910, and with the quadrature phase local oscillator signal by mixer 912.

Mixers 910 and 912 perform multiplication between the input signal and the appropriate local oscillator signal in order to achieve the required frequency down-conversion. The desired I and Q components can then be isolated using low pass filters 914 and 916 respectively, which are used to suppress unwanted frequencies associated with signals adjacent in adjacent channels etc. Finally, analogue to digital converters (A/Ds) 918 and 920 convert the I and Q components into binary representations of the I and Q message data 922 and 924. Once in the digital domain, further processing can be performed on the I and Q data, including recombination of the components to form the original data message. The original data message can then be used by a receiving device.

Referring back to FIG. 8A, each transmission control block 822, 824 may use corresponding components to modulate a carrier signal for transmission based on a baseband digital signal with I and Q components. In this case, the LNA may amplify a signal from mixers 910 and 912 before the resultant signal is sent to an output pin, i.e. the direct of components including LNA 902 is reversed.

Figure 8B:
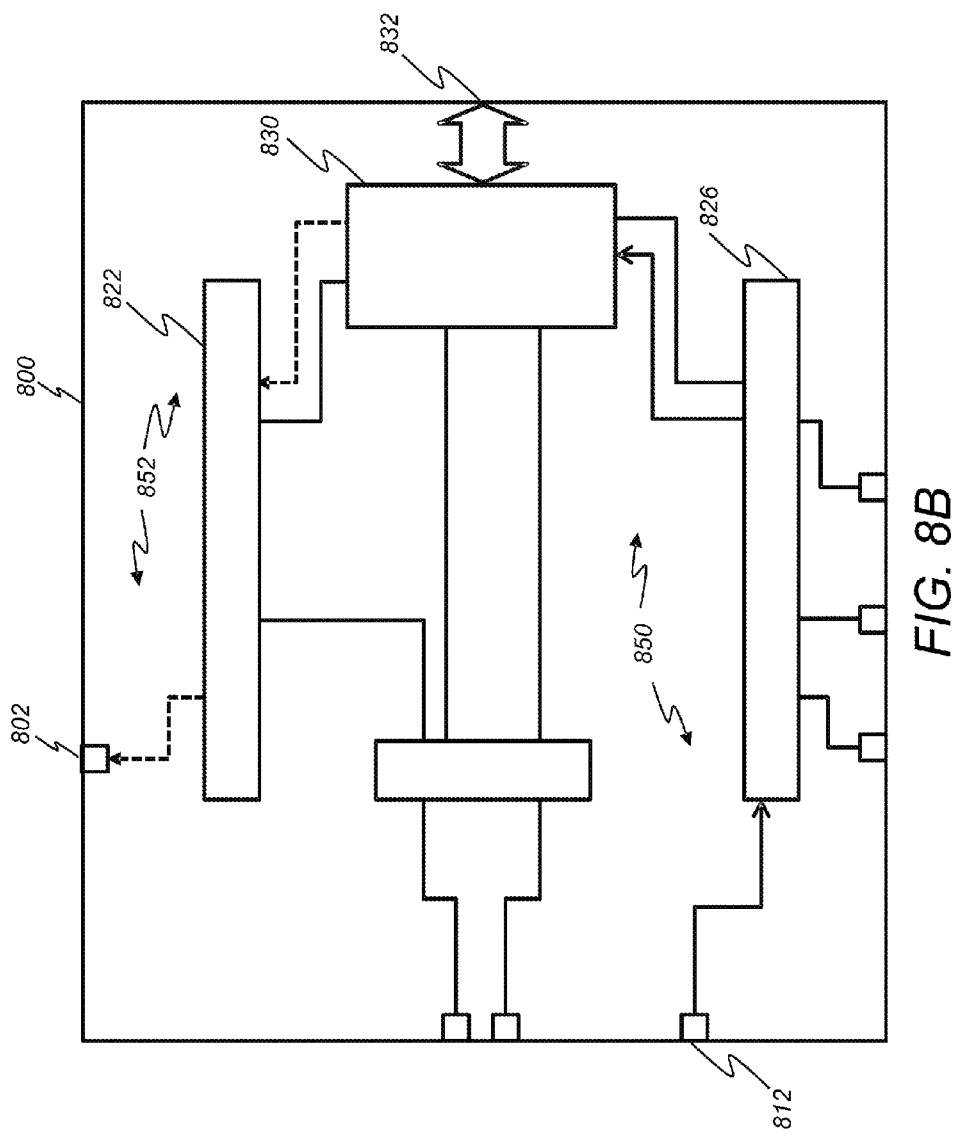
FIG. 8B shows a receive operation using the exemplary radio frequency integrated circuit.

FIG. 8B shows a first routing of a transmission signal within the RFIC 800. A digit it baseband signal is received by the controller interface 830 from a baseband subsystem via coupling 832. This signal is then routed to the first transmission control block 822 for conversion to a first radio frequency signal, i.e. a modulated signal carried by a carrier wave. The first transmission control block 822 then outputs the first radio frequency signal to output pin 802. If RFIC is used RFIC 208 in FIG. 2, the first radio frequency signal may be transmitted by first antenna 202 after processing by the first power amplifier 206 and the first FEM 204. The first routing defines a first circuit pathway 852, of which at least a portion of said pathway is within the RFIC.

FIG. 8B also shows a routing of a reception signal within the RFIC 800. A received signal is input to input pin 812. If the RFIC is used as RFIC 208 in FIG. 2, the reception signal may comprise a second radio frequency signal received by first antenna 202, which is processed the first FEM 204. The input signal is routed to the reception control block 826 for conversion to a digital baseband, for example using the components shown in FIG. 9. The reception control block 826 then outputs the baseband signal to the controller interface 830, which may perform further processing and/or send the baseband signal to a baseband subsystem via coupling 832. The routing of the reception signal defines a second circuit pathway 850, of which at least a portion of said pathway is within the RFIC.

Figure 8C:
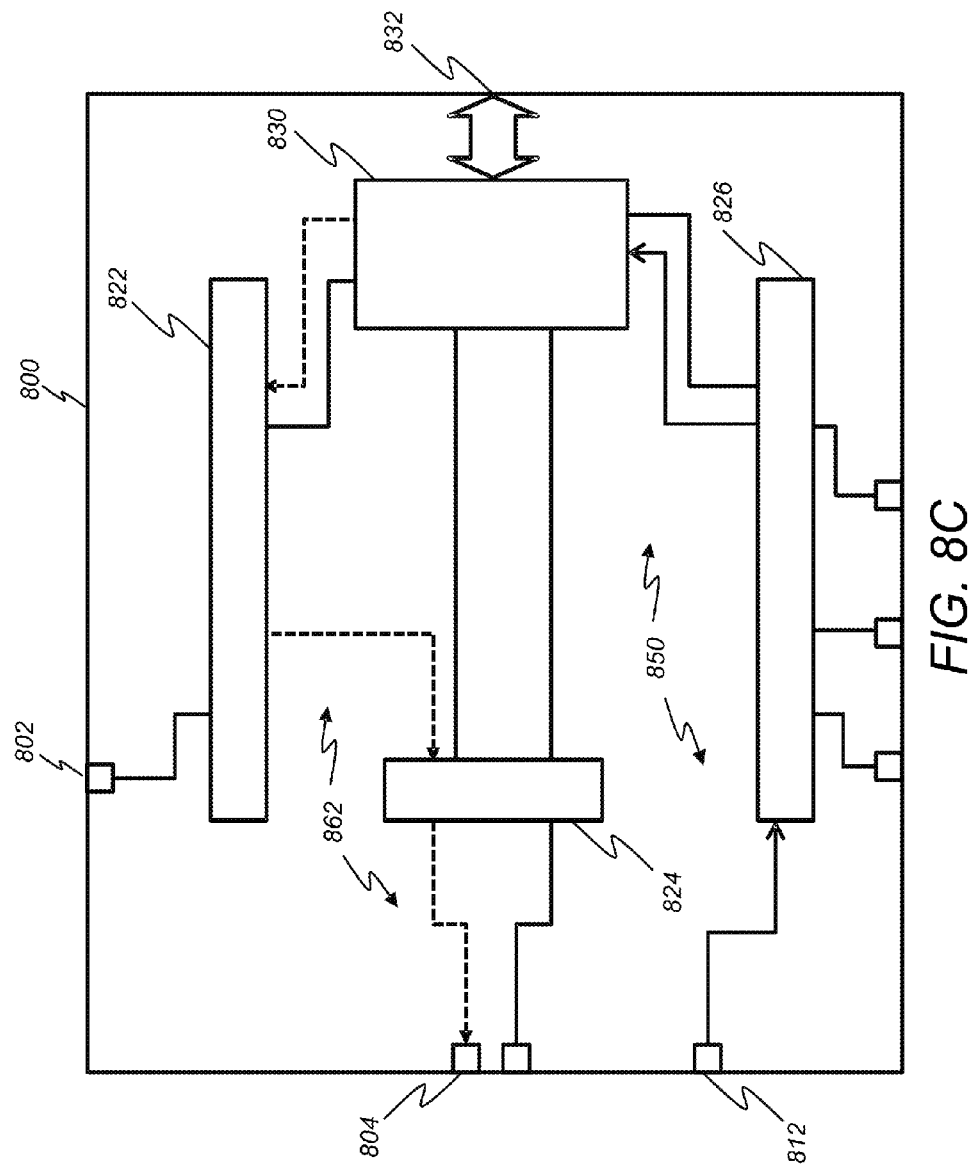
FIG. 8C shows a receive operation using the exemplary radio frequency integrated circuit according to a fourth embodiment.

If a portion of the first circuit pathway that couples a transmission antenna to output pin 802 is physically proximate to a portion of the second circuit pathway that couples a reception antenna to input pin 812, then current leakage from the portion of the first circuit pathway may affect, as an example, the quality of the signal received at the input pin 812. For example, this may occur with the first and second circuit pathways as described with regard to FIG. 2. If the received signal at the input pin 812 has a noise level above the maximum noise level specified for an LNA of the reception control block 826, e.g. LNA 902, then system performance may be degraded. In FIG. 8C an alternate routing of a transmission signal is performed during a reception mode wherein the signal received at input pin 812 is processed.

In FIG. 8C, during a reception mode, the first transmission control block 822 is controlled so as to divert a first radio frequency signal to the second transmission control block 824. The second transmission control block 824 then routes the first radio frequency signal to alternate output pin 804. In some embodiments, instead of routing the first frequency signal to an alternate output pin, such as output pin 804, the first frequency signal may be routed to a predefined termination load inside and/or outside the RFIC 800. This predefined termination load may comprise, amongst others, one or more fixed, adjustable, resistive, high impedance, low impedance and/or capacitive loads. Either case results in an alternate routing 862, wherein the first radio frequency signal is output on output pin 804 rather than output pin 802. In an ideal case, there will be no signal visible at output pin 802. In practical implementations there may be a small attenuated signal at output pin 802, however this attenuated signal is below a predefined noise threshold. If the RFIC 800 is coupled to the arrangement of FIG. 2, this may result in the first radio frequency signal being routed via a portion of a third circuit pathway that encompasses the second power amplifier 216 and the second FEM 214. The second FEM 214 may appropriate control one or more switches so as to prevent the first radio frequency signal from being transmitted via one of the second or third antennas 212, 222. After the reception mode has finished, the first routing 852 within the RFIC 800 is used again for the transmission mode. During both modes, as many components as are necessary for transmission and/or reception of radio frequency signals stay active; however, certain components that can be quickly switched, i.e. that can be switched without affecting signal interference, may be shut down or put into a low power state to conserve and/or reduce current consumption.

In a first variation of the fourth embodiment illustrated in FIG. 8A, an alternate routing within the RFIC 800 for a transmission signal during a reception mode may be chosen based on local current leakage within the RFIC itself. For example, in this variation, output pins 802 and 804 may be coupled to the same set of external components, e.g. the first power amplifier 206 of FIG. 2. If local current leakage within the RFIC may predominately affecting a received signal then internal routing of a transmission signal may be modified to distance the transmission signal from a received signal. For example, in this case, in a transmission mode, routing 862 via the second transmission control block 824 and output pin 804 may be used as a standard path for transmission. In a reception mode, the transmission signal may be diverted, e.g. switched, to use routing 852 via output pin 802.

In a second variation of the fourth embodiment illustrated in FIG. 8A, there may be an arrangement of two synthesizers: a first synthesizer arranged to generate a radio frequency signal at a carrier frequency for transmission and/or reception; and a second synthesizer arranged to generate a radio frequency signal at a second frequency or frequency band. For example, in a dual band telecommunications device there may exist two synthesizers: a first generating a signal at a first frequency and another generating a signal at an alternate frequency. In certain embodiments, the first transmission control block 822 may comprise the first synthesizer and the second transmission control block 824 may comprise the second synthesizer. In any case, in a transmission mode, the first synthesizer is used to generate the first radio frequency signal for transmission. In a reception mode, the RFIC 800 is switched such that the second synthesizer is used to generate the first radio frequency signal, in which case interference between the first radio frequency signal in the reception mode and a second radio frequency received at an input pin is reduced as they each signal has a different frequency or band of frequencies. The frequency offset between the first and second radio frequency signals in the reception mode may: be larger than the channel bandwidth of the received second radio frequency signal; be chosen such that the first radio frequency signal is filtered by a stop band filter, such as the tuneable or split-band filter arrangements of the second and third embodiments, which may be combined with the present variation; be chosen to be out of band.

In a further variation of the described embodiments, local signal leakage from a transmit signal to a reception path may be degraded by shifting a TX VCO signal to an alternate frequency when a transmission period ends. For example, for the time periods shown as 3026 (TX VCO fall time) in FIG. 3E, the TX VCO signal may be shifted to an alternate frequency. In this variation, the main power of local signal energy is shifted to an alternate frequency in a reasonably short time period, followed by the transition of residual signal energy, which typically takes more time. This may reduce signal interference that occurs in reception operations, for example, time periods 3014 and 3016 as shown in FIG. 3E. Prior to a subsequent transmission slot the TX VCO is then re-shifted to its original frequency prior to the information slots for transmission, taking account of any settling time that is required.

As described herein, certain embodiments have a benefit of reducing local current leakage from a first circuit pathway to a second circuit pathway and thus of reducing additive noise for a received signal. Certain embodiments may be implemented using firmware controls, thus minimizing the amount of circuit redesign required for existing implementations.

In some embodiments a first local radio frequency signal for transmission and a second received radio frequency signal may comprise a common frequency component, wherein at least a portion of the first radio frequency signal, or a signal based on the first radio frequency signal, is present during at least a portion of the time for operations in a reception mode. These embodiments provide a solution that can accommodate rapid switching between transmission and reception modes of TDD schemes. A transmission mode may comprise one or more periods of time or operations associated with the transmission of a signal, including time periods where no data is being transmitted. Likewise, a reception mode may comprise one or more periods of time or operations associated with the reception of a signal, including time periods where no data is being received. The time for a transmission mode and the time for a reception mode may overlap.

The TDD transceiver may comprise a radio frequency integrated circuit for processing at least one of the first and second radio frequency signals. In this case the alternate circuit pathway may comprise an alternate local signal path within the radio frequency integrated circuit for the first radio frequency signal. The first circuit pathway may also comprise a first output of the radio frequency integrated circuit and the alternate circuit pathway may comprise a second output of the radio frequency integrated circuit. The alternate circuit pathway may comprise an alternate transmission path that is selectable by the radio frequency integrated circuit. Embodiments such as these may be implemented using existing radio frequency integrated circuit (RFIC) functionality, making the embodiments widely and easily applicable to existing systems. These variations may also be combined in a number of different combinations making the embodiments flexible for different implementation requirements.

In some embodiments, the first circuit pathway comprises a first power amplifier and the alternate circuit pathway comprises a second power amplifier. In this case, in the reception mode, the method may comprise setting the second power amplifier to a high isolation state. For example, in a multi-radio communication system, a second power amplifier that is used for another type of transmission, such as a multi-mode amplifier, may be reused as a path for the first radio frequency signal during a reception mode.

In certain cases, the first circuit pathway comprises a first set of radio frequency components and the alternate circuit pathway comprises a second set of radio frequency components. In this case, in the transmission mode, the method may comprise selecting the first set of radio frequency components with control circuitry such as one or more switches, and, in the reception mode, selecting the second set of radio frequency components with the control circuitry. The first set of radio frequency components may comprise a first filter and second set of radio frequency components may comprise a second filter. In these embodiments, a first radio frequency signal may be switched through a different circuit pathway through a different set of existing components by appropriately setting digital switch control signals. This makes it easy to implement on existing hardware without modifies the circuit design.

The TDD transceiver may comprise a voltage-controlled oscillator. In this case, the method may comprise, in the transmission mode, using a signal from the voltage-controlled oscillator to generate the first radio frequency signal and, in the reception mode, using the signal from the voltage-controlled oscillator to process the second radio frequency signal. In this case, in the reception mode, the method may comprise using the signal from the voltage-controlled oscillator to generate the first radio frequency signal. In these cases, transmission and reception components are active in both transmission and reception modes, e.g. the first radio frequency signal is not turned off and/or there may be an overlap between the times that a transmit and a receive signal are present. This avoids problems with settling times of components when switching between the two modes.

In some embodiments, a radio frequency integrated circuit comprises a first local signal path comprising at least a portion of the first circuit pathway and a second local signal path comprising at least a portion of the third circuit pathway, wherein the control circuitry is arranged to switch between the first and second local signal paths of the radio frequency integrated circuit. In some embodiments, the radio frequency integrated circuit comprises a first output interface comprising at least a portion of the first circuit pathway and a second output interface comprising at least a portion of the third circuit pathway, wherein the control circuitry is arranged to switch between the first and second output interfaces of the radio frequency integrated circuit. Again, in these cases, signal leakage can be reduced by modifying the control provided by the control circuitry and without modifying the physical arrangement. In some case, the first output interface and the second output interface are coupled to a common antenna.

In one implementation, the apparatus comprises a mobile communications device further comprising user interface circuitry and user interface software configured to facilitate user control of at least some functions of the mobile communications device through use of a display. In another implementation the apparatus comprises a base-station, the base-station being coupled to a telecommunications network.

The method and apparatus may be applied in a Time Division-Long Term Evolution (TD-LTE) system.

Any of the implementations and embodiments described herein may be embodied within a telecommunications device or terminal. For example, the described embodiments may form part of a modem. A modem may be supplied as either a stand-alone device, such as a so-called 'dongle', or as a module for integration into an electronic device, for example a machine-to-machine module, a system in package, or a modem chip or chipset. A telecommunications device or terminal may also include, amongst others: (a) wired and wireless telephones, (b) satellite telephones, (c) personal communication devices, (d) electronic devices configured to share content in a local area network (LAN), (e) electronic gaming devices, (f) electronic music devices including, but not limited to, MP3 players and the like, (g) telecommunications network infrastructure equipment, including but not limited to a base station, so-called femto-cells with wireless communication capability or routing devices, (h) dual-triode cellular terminals which utilize a cellular network and a non-cellular network, (i) other types of mobile devices or terminals, (j) any machines configured for wireless communications in various applications, including but not limited to, smart homes, smart metering, fleet management, smart automobiles, remote healthcare, or access network operation management, or (k) any device used in a device-to-device connection, for example machine-to-machine communication. "Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), etc., as well as fixed or more static devices, such as personal computers, game consoles and other generally static entertainment devices, various other domestic and non-domestic machines and devices, etc. The term "user equipment" is often used to refer to wireless devices in general, and particularly mobile wireless devices. The implementations and embodiments may be used for signalling between user equipment and network devices, for example for radio resource sharing. A network may be configured in accordance with Long Term Evolution (LTE) or the network may employ other mobile access mechanisms such as wideband code division multiple access (W-CDMA), time division multiple access (TDMA), CDMA2000, GSM, general packet radio service (GPRS), LTE-Advanced (LTE-A) and/or the like.

It will be understood that the processor or processing system or circuitry referred to herein may in practice be provided by a single chip or integrated circuit or plural chips or integrated circuits, optionally provided as a chipset, a SIP module, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in memory and executable by the processor, or by hardware, or by a combination of tangibly stored software and hardware (and tangibly stored firmware). As such the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The above embodiments are to be understood as illustrative examples of the invention. Further embodiments of the invention are envisaged. For example, instead of modifying the circuit pathway taken by a transmission signal, the circuit pathway taken by a received signal may be modified, e.g. by routing the received signal along a different path and/or through a different set of processing components. In any of the described embodiments the properties of a power amplifier on a modified circuit pathway may be changed in a reception mode, for example the power amplifier may be set to an 'off' state with a voltage bias and control signals set to produce a high isolation state. Any power amplifier may comprise a multimode power amplifier responsible for the amplification of one or more signals. In one variation a transmission signal may be routing to a circuit pathway in a reception mode that comprises a harmonic filter used for other transmitted signals. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed:

1. A method of controlling a time division duplex (TDD) transceiver, the TDD transceiver comprising a first circuit pathway for transmission and a second circuit pathway for reception, the method comprising:
   in a transmission mode, using the first circuit pathway for transmission of a first radio frequency signal, the first radio frequency signal being generated based on a signal from a voltage-controlled oscillator; and
   in a reception mode, using the second circuit pathway for reception of a second radio frequency signal,
   wherein the signal from the voltage-controlled oscillator is present for at least a portion of the reception mode,
   wherein the second radio frequency signal and the signal from the voltage-controlled oscillator comprise a common frequency component,
   wherein the first circuit pathway comprises a filter component, and
   wherein the method comprises, in at least a portion of the reception mode:
      modifying a frequency response of the filter component to attenuate at least said common frequency component that is present in local signal leakage received at the filter component, the local signal leakage resulting from at least the signal from the voltage-controlled oscillator.

2. The method of claim 1, wherein the TDD transceiver comprises a radio frequency integrated circuit for processing at least one of the first and second radio frequency signals.

3. The method of claim 1, further comprising:
   in the transmission mode, implementing a first set of one or more operating parameters of the filter component to filter the first radio frequency signal for transmission; and
   in at least a portion of the reception mode, implementing a second set of one or more operating parameters of the filter component to filter the common frequency component of said local signal leakage.

4. The method of claim 1, wherein said filter component comprises a first set of radio frequency components and a second set of radio frequency components, the method further comprising:
   in the transmission mode, selecting the first set of radio frequency components with control circuitry; and
   in the reception mode, selecting the second set of radio frequency components with said control circuitry.

5. The method of claim 4, wherein the first set of radio frequency components comprises a first filter to filter the first radio frequency signal for transmission and second set of radio frequency components comprises a second filter to filter the common frequency component of said local signal leakage.

6. The method of claim 1, wherein the method comprises:
   in the reception mode, using a signal from the at least one voltage-controlled oscillator to process the second radio frequency signal.

7. Apparatus for time division duplex (TDD) communication comprising:
   a first circuit pathway for transmission of a first radio frequency signal, the first radio frequency signal being generated based on a signal from a voltage-controlled oscillator, the first circuit pathway comprising a filter component;
   a second circuit pathway for reception of a second radio frequency signal; and control circuitry,
   wherein said filter component is arranged to receive, during at least a portion of a reception mode, local signal leakage resulting from at least the signal from the voltage-controlled oscillator,
   wherein the second radio frequency signal and the signal from the voltage-controlled oscillator comprise a common frequency component, and
   wherein the control circuitry is arranged to control, during at least a portion of a reception mode, said filter component to modify a frequency response of the filter component to attenuate at least said common frequency component.

8. The apparatus of claim 7, further comprising:
   a radio frequency integrated circuit for generating the first radio frequency signal and for processing the second radio frequency signal.

9. The apparatus of claim 8, wherein the control circuitry is arranged to set, in a transmission mode, a first set of one or more operating parameters of the filter component to filter the first radio frequency signal for transmission and to set, in at least a portion of a reception mode, a second set of one or more operating parameters of the filter component to filter the common frequency component.

10. The apparatus of claim 7, wherein the first circuit pathway and the second circuit pathway are coupled to a common antenna.

11. The apparatus of claim 7, wherein the first circuit pathway comprises a power amplifier.

12. The apparatus of claim 11, wherein the control circuitry is arranged to set the power amplifier to a high isolation state during the reception mode.

13. The apparatus of claim 7, wherein said filter component comprises a first set of radio frequency components and a second set of radio frequency components, each set of radio frequency components being selectable by the control circuitry, the control circuitry being arranged to select the first set of radio frequency components in a transmission mode and to select the second set of radio frequency components in at least a portion of a reception mode.

14. The apparatus of claim 7, further comprising:
one or more voltage-controlled oscillators, the one or more voltage-controlled oscillators including the voltage-controlled oscillator for use in generating the first radio frequency signal and being arranged to output a signal for use in processing the second radio frequency signal.

15. The apparatus of claim 7, wherein the apparatus comprises a TDD transceiver forming part of a terminal device.

16. The apparatus of claim 7, wherein the apparatus comprises a mobile communications device, the apparatus further comprising:
user interface circuitry; and
user interface software configured to facilitate user control of at least some functions of the mobile communications device through use of a display.

17. The apparatus of claim 7, wherein the apparatus comprises a base-station, the base-station being coupled to a telecommunications network.

18. A modem comprising the apparatus of claim 7.

* * * * *